(12) United States Patent
Buhacoff

(10) Patent No.: US 11,831,680 B2
(45) Date of Patent: *Nov. 28, 2023

(54) ELECTRONIC AUTHENTICATION INFRASTRUCTURE

(71) Applicant: Cryptium Corporation, Hillsboro, OR (US)

(72) Inventor: Jonathan Buhacoff, Portland, OR (US)

(73) Assignee: Cryptium Corporation, Hillsboro, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/719,977

(22) Filed: Apr. 13, 2022

(65) Prior Publication Data

US 2022/0247783 A1 Aug. 4, 2022

Related U.S. Application Data

(63) Continuation of application No. 16/457,784, filed on Jun. 28, 2019, now Pat. No. 11,336,686.

(60) Provisional application No. 62/691,480, filed on Jun. 28, 2018.

(51) Int. Cl.
| | |
|---|---|
| H04L 29/06 | (2006.01) |
| H04L 9/40 | (2022.01) |
| H04L 9/08 | (2006.01) |
| H04L 9/32 | (2006.01) |

(52) U.S. Cl.
CPC ........ *H04L 63/1483* (2013.01); *H04L 9/0825* (2013.01); *H04L 9/0869* (2013.01); *H04L 9/3271* (2013.01); *H04L 63/08* (2013.01); *H04L 63/205* (2013.01)

(58) Field of Classification Search
None
See application file for complete search history.

(56) References Cited

U.S. PATENT DOCUMENTS

| | | |
|---|---|---|
| 9,516,059 B1 | 12/2016 | Dotan |
| 9,838,384 B1 | 12/2017 | Kane-Parry |
| 10,063,543 B2 | 8/2018 | Alonso Cebrian |
| 11,336,686 B2 * | 5/2022 | Buhacoff ............ H04L 63/1483 |
| 2005/0010871 A1 | 1/2005 | Ruthfield |
| 2006/0182283 A1 | 8/2006 | Sandhu |
| 2007/0005776 A1 | 1/2007 | Hansen |
| 2007/0033642 A1 | 2/2007 | Ganesan |
| 2009/0100530 A1 | 4/2009 | Chen |
| 2013/0346747 A1 | 12/2013 | Ignatchenko |
| 2014/0033286 A1 | 1/2014 | Zhang |
| 2014/0189808 A1 | 7/2014 | Mahaffey |

(Continued)

OTHER PUBLICATIONS

U.S. Appl. No. 16/457,784, filed Jun. 28, 2019, 146 Pages.

(Continued)

*Primary Examiner* — Benjamin E Lanier
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, using one or more computing devices to facilitate and/or support one or more operations and/or techniques for electronic authentication infrastructure, such as implemented, at least in part, via one or more electronic communications.

34 Claims, 12 Drawing Sheets

(56) References Cited

U.S. PATENT DOCUMENTS

| | | |
|---|---|---|
| 2017/0244555 A1 | 8/2017 | Beiter |
| 2018/0041510 A1 | 2/2018 | Burch |

OTHER PUBLICATIONS

Filing Receipt, U.S. Appl. No. 16/457,784, filed Jul. 15, 2019, 3 Pages.
Notice of Publication, U.S. Appl. No. 16/457,784, dated Jan. 2, 2020, 1 Page.
Office Action, U.S. Appl. No. 16/457,784, dated Mar. 22, 2021, 23 Pages.
Response to Office Action, U.S. Appl. No. 16/457,784, filed Jul. 22, 2021, 17 Pages.
Final Office Action, U.S. Appl. No. 16/457,784, dated Jul. 30, 2021, 39 Pages.
Response to Final Office Action, U.S. Appl. No. 16/457,784, filed Oct. 21, 2021, 22 Pages.
Advisory Action, U.S. Appl. No. 16/457,784, dated Oct. 28, 2021, 4 Pages.
Pre-Appeal Brief Request/Notice of Appeal, U.S. Appl. No. 16/457,784, filed Nov. 29, 2021, 12 Pages.
Notice of Panel Decision from Pre-Appeal Brief Review, U.S. Appl. No. 16/457,784, Mailed Dec. 14, 2021, 2 Pages.
RCE/Amendment, U.S. Appl. No. 16/457,784, filed Jan. 28, 2022, 25 Pages.
Notice of Allowance, U.S. Appl. No. 16/457,784, dated Feb. 24, 2022, 17 Pages.
Issue Fee/Rule 312, U.S. Appl. No. 16/457,784, filed Apr. 8, 2022, 17 Pages.
Issue Notification, U.S. Appl. No. 16/457,784, dated Apr. 27, 2022, 1 Page.
Abadi, "Prudent Engineering Practice for Cryptographic Protools," Proceedings of the 1994 IEEE Computer Society Symposium on Research in Security and Privacy, Jun. 1, 1994, 33 Pages.
Abadi, "Prudent Engineering Practice for Cryptographic Protools," 1063-7109194 1994 IEEE, 15 Pages.
Berners-Lee, "Hypertext Transfer Protocol—HTTP/1.0," https://datatracker.ietf.org/doc/html/rfc1945, May 1996, 60 Pages.
Burrows, "A Logic of Authentication," ACM Transactions on Computer Systems, vol. 8, No. 1, Feb. 1990, 19 Pages.
Crispin, "Interactive Mail Access Protocol—Version 2," https://datatracker.ietf.org/doc/html/rfc1064, Jul. 1988, 26 Pages.
Dierks,"The TLS Protocol Version 1," https://datatracker.ietf.org/doc/rfc2246/, Jan. 1999, 80 Pages.
Dierks, "The Transport Layer Security (TLS) Protocol Version 1.1," https://datatracker.ietf.org/doc/html/rfc4346, Apr. 2006, 87 Pages.
Franks, "An Extension to HTTP: Digest Access Authentication," https://datatracker.ietf.org/doc/html/rfc2069, Jan. 1997, 18 Pages.
Freier, "The SSL Protocol Version 3.0," https://tools.ietf.org/pdf/draft-ietf-tls-ssl-version3-00.txt, Nov. 18, 1996, 64 Pages.
Haller, "On Internet Authentication," https://datatracker.ietf.org/doc/html/rfc1704, Oct. 1994, 17 Pages.
Hickman, "The SSL Protocol," https://datatracker.ietf.org/doc/pdf/draft-hickman-netscape-ssl-00.txt, Apr. 1995, 26 Pages.
Reichl, KeePass Password Safe, https://keepass.info, Jul. 16, 2021, 2 Pages.
Lloyd, "PPP Authentication Protocols," https://datatracker.ietf.org/doc/html/rfc1334, Oct. 1992, 16 Pages.
M'Raihi, "HOTP: An HMAC-Based One-Time Password Algorithm," https://datatracker.ietf.org/doc/html/rfc4226, Dec. 2005, 37 Pages.
Reynolds, "Post Office Protocols," https://datatracker.ietf.org/doc/html/rfc918, Oct. 1984, 5 Pages.
RSA The Security Division of EMC, "RSA SecurID Solution Named Best Third-Party AuthenticationDevice by Windows IT Pro Magazine Readers' Choice 2004," https://web.archive.org/web/20100106232859/http:/rsa.com/press_release.aspx?id=5028, Jul. 16, 2021, 2 Pages.
Schneier, "Applied Cryptography," https://www.schneier.com/books/applied-cryptography/, Downloaded Jul. 16, 2021, 662 Pages.
Wikipedia, "Central processing unit," https://en.wikipedia.org/wiki/Central_processing_unit, Downloaded Jul. 16, 2021, 22 Pages.
Wikipedia, "EPROM" https://en.wikipedia.org/wiki/EPROM, Downloaded Jul. 16, 2022, 7 Pages.
Wikipedia, "Internet Explorer version history," https://en.wikipedia.org/wiki/Internet_Explorer_version_history, Downloaded Jul. 16, 2021, 19 Pages.
Wikipedia, "KeePass," https://en.wikipedia.org/wiki/KeePass, Downloaded Jul. 16, 2021, 6 Pages.
Wikipedia, "Modem," https://en.wikipedia.org/wiki/Modem, Downloaded Jul. 16, 2021, 17 Pages.
Wikipedia, "Netscape (web browser)," https://en.wikipedia.org/wiki/Netscape_(web_browser), Downloaded Jul. 16, 2021, 11 Pages.
Wikipedia, "Random-access memory," https://en.wikipedia.org/wiki/Random-access_memory, Downloaded Jul. 16, 2021, 18 Pages.
Ylonen, "The Secure Shell (SSH) Authentication Protocol," https://datatracker.ietf.org/doc/html/rfc4252, Jan. 2006, 17 Pages.

* cited by examiner

ELECTRONIC AUTHENTICATION INFRASTRUCTURE

CROSS-REFERENCE TO RELATED APPLICATIONS

This application claims the benefit of and priority to U.S. Provisional Patent Application Ser. No. 62/691,480, entitled "ELECTRONIC AUTHENTICATION SYSTEM," filed on Jun. 28, 2018, which is assigned to the assignee hereof and which is expressly incorporated herein by reference.

BACKGROUND

1. Field

The present disclosure relates generally to electronic authentication and, more particularly, to electronic authentication infrastructure, such as to facilitate and/or support mitigating on-line phishing attacks, including on-line proxy phishing attacks, for example.

2. Information

The Internet is widespread. The World Wide Web or simply the Web, provided by the Internet, is growing rapidly, at least in part, from the large amount of content being added seemingly on a daily basis. A wide variety of content in the form of stored signals, such as, for example, web pages, text documents, images, audio files, video files, or the like is continually being identified, located, retrieved, accumulated, stored, and/or communicated. Today, a large number of people are on-line users living their lives on the Internet, including on-line shopping, banking, socializing, working, playing games, or the like. As our digital lives are becoming increasingly important, they are also becoming increasingly exposed to greater risks. For example, in some instances, on-line users may be exposed to so-called on-line "phishing" or "phishing attacks," such as malicious attempts to trick the users into disclosing their login credentials, passwords, personal information, or the like to an attacker.

Typically, although not necessarily, a phishing attack may be carried out via, for example, a clickable hyperlink in an e-mail, website, advertisement, electronic bookmark, etc., incorrect user input, such as misspelling of a domain name in a uniform resource locator (URL), or any other process that may open a web browser application on a user's computing device to a website controlled by an attacker, called a "phishing trap." In a phishing attack, an attacker's website may masquerade as or impersonate a legitimate website and/or service a user may want to electronically access, for example, and may attempt to trick the user to input login or like user credentials, such as username, password, or the like. In some instances, a successful phishing attack may, for example, grant an attacker temporary or continual access to a particular electronic system (e.g., a user's on-line e-mail, bank account, etc.), provide an attacker with personal knowledge about an on-line user, etc., may be used to conduct further attacks on the same and/or other electronic systems accessible to such a user, or the like. Greater flexibility and/or variety of authentication approaches, such as to facilitate and/or support mitigating on-line phishing attacks, for example, may, therefore, be desirable.

BRIEF DESCRIPTION OF THE DRAWINGS

Claimed subject matter is particularly pointed out in the concluding portion of the specification. However, as to organization and/or method of operation, together with objects, features, and/or advantages thereof, it may best be understood by reference to the following detailed description, if read with the accompanying drawings, in which:

Figure 1:
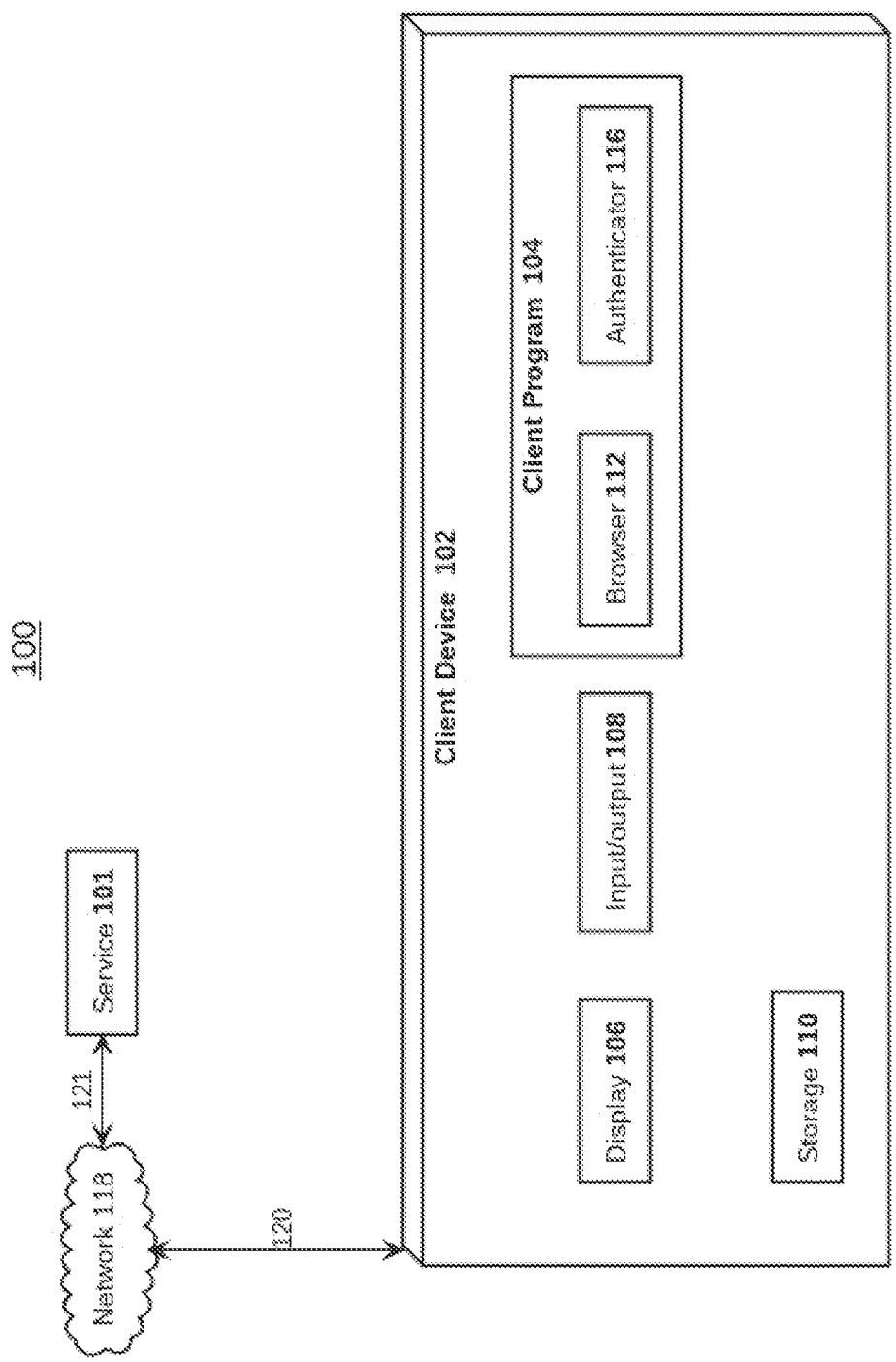
FIGS. 1-3 are schematic diagrams illustrating features associated with implementations of example operating environments for electronic authentication infrastructure.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for electronic authentication infrastructure, such as implemented, for example, via one or more electronic communications and/or computing and/or communications networks and/or protocols (e.g., network protocols) discussed herein. For example, as will be seen, in some instances, one or more operations and/or techniques for electronic authentication infrastructure may be implemented, at least in part, via a client program or like electronic process associating a particular domain name with one or more user credentials for the domain name, such as without further human interaction and/or input. As will also be seen, at times, a transport layer security (TLS) protocol may, as one example, be employed herein, in whole or in part, such as to facilitate and/or support more secure electronic network communications, which may include forwarding an authenticated session to one or more client devices, for example. As also discussed below, in some instances, such as if it is determined that a particular client device requesting a login is suspicious or otherwise untrusted, for example, a client program or like electronic process may open a separate or different instance of the client program on the client device, such as a web browser or browser, as one non-limiting example, in a separate computer window, such as to facilitate and/or support a more secure login. As used herein, "on-line" refers to a type of a communication and/or process that may be implemented electronically, such as via one or more suitable communications networks (e.g., wireless, wired, etc.), for example. It should also be noted that "on-line user" and "user" may be used interchangeably herein.

Thus, as alluded to previously, a so called on-line "phishing attack" or "phishing" may include a malicious attempt to trick on-line users into disclosing their login user credentials, passwords, personal information, or the like to an attacker. In some instances, a successful phishing attack may, for example, grant an attacker temporary or continual access to an electronic system of a particular service, such as an on-line bank account, e-mail, etc., may provide an attacker with personal knowledge about an on-line user, or the like. As was also indicated, a successful phishing attack may also be used, for example, to conduct further attacks on the same and/or other electronic systems of one or more services accessible to an on-line user. Typically, although not necessarily, a phishing attack may begin, for example, with a clickable hyperlink embedded in a website, e-mail, advertisement, electronic bookmark, or the like. As was also discussed, at times, a phishing attack may begin, for example, with incorrect user input, such as misspelling of a domain name in a uniform resource locator (URL), and/or any other process that may open a web browser or like application on a user's computing device to a website controlled by an attacker, called a "phishing trap".

Typically, "phishing trap" refers to a fraudulent website and/or service that attempts to trick a user into disclosing one or more user credentials, such as a username, password, and/or other personal information, and is accessed via a browser or like process over an electronic network, including, but not limited to, websites and/or application programming interfaces. It should be understood that wherever a computer program, such as a client program, for example, interacts with a service, it may not be immediately apparent to the computer program and/or its user whether the service is legitimate or whether it is a phishing trap. Particular examples of a service, client program interacting with a service, etc. will be discussed in greater detail below. In some instances, such as in a less sophisticated phishing attack, a phishing trap may, for example, masquerade as another website, service, etc. a user may want to access, such as in an attempt to trick the user to input login or like user credentials, such as a username, password, or the like.

At times, such as in a more sophisticated phishing attack known as a "proxy" phishing attack, for example, a phishing trap may actively relay one or more authenticating inputs from an on-line user to a legitimate website and/or service and/or one or more authenticating outputs from the legitimate website and/or service to the user. In some instances, it has been observed that a likelihood of a successful phishing attack may, for example, be increased if an on-line user may have the ability to access an electronic system by simply following a hyperlink, if an electronic system is unable to differentiate between an attacker and a legitimate user who is using a new or reset client device, browser application, etc., if an on-line user is unable to recognize that an electronic system being accessed is a phishing trap (e.g., via checking a URL in an address bar, etc.), or the like. In some instances, a likelihood of a successful phishing attack may also depend, at least in part, on a particular authentication approach. For example, it has also been observed that a likelihood of a successful phishing attack may be increased if an authentication approach prompts or asks an on-line user to input a password or other sensitive information, such as into a web browser.

To address these or like challenges, in some instances, one or more authentication approaches, such as, for example, transport layer security (TLS), "site image" or "site phrase," "security questionnaires," "two-factor authentication codes" (also known as a "one-time passcode" or "temporary authorization code") may be employed, in whole or in part. For example, a TLS authentication approach may visually indicate to on-line users that on-line content they are seeing is coming from a server certified to provide content for a particular URL shown in an address bar of a web browser. At times, however, a TLS authentication approach may not be effective against a particular phishing attack, such as a proxy phishing attack, for example, because an attacker may obtain a TLS certificate for a phishing trap using its own domain name. Also, certain users may not notice an attacker's domain name on a proxy phishing website, for example, because they may not know a legitimate domain name. In addition, certain web browsers may not display a URL, such as without a specific request by a user, for example.

In some instances, a savvy attacker may construct a particular URL so as to trick an on-line user. To illustrate, if a particular target domain name is "example.com," for example, an attacker may obtain a certificate for "example-.com" (e.g., using a number "one" instead of a lowercase "l"), or "example.com.at.attacker.net" (e.g., using the intended domain as a subdomain name of the attacker's own domain), or "attacker.net/example.com" (e.g., using the intended domain as a path component), etc. At times, an attacker may attempt to mislead a user by, for example, creating a domain name with particular "trustworthy" sounding words, such as, for example, "secure," "global," "online," "login," etc. related to a target website, such as "bank," "insurance," "benefits," etc. in place of "attacker.net" in the above example, or the like.

As another example, a site image or site phrase may comprise an arbitrary image and/or phrase selected by an on-line user and/or a website displayed to the user during a login process, such as between entering login user credentials (e.g., a username, password, etc.), for example. Generally, a site image or site phrase is intended to help a user recognize a particular website in some way other than a URL. Likewise, in some instances, a site image or site phrase may not be effective against a proxy phishing attack because an attacker may obtain and/or receive a username, for example, and may relay the username to a target website, receive a site image or site phrase from the target website, and then display the same site image or site phrase to the user.

As yet another example, a security questionnaire may comprise one or more questions, usually of a personal nature, that a website asks a user to answer in advance and then presents these one or more questions during a login process. Typically, a website may display a security questionnaire if, for example, a user is attempting to login from an unrecognized browser, client device, etc., which, at times, may indicate that a login request is coming from an attacker. Here, an attacker may know answers to one or more questions, such as if such answers can be found in public and/or stolen databases of personal information about a user, for example. Thus, likewise, in some instances, a security questionnaire may not be effective against a proxy phishing attack because an attacker may relay one or more questions to a user, for example, and then relay corresponding answers to a target website.

As yet another example, a two-factor authentication code may comprise a code that may be sent to a user via e-mail, text message, specialized application, and/or some other process outside of a web browser. A user may then enter that code into a particular website in order to proceed with a login. Similarly, in some instances, two-factor authentication codes may not be effective against a proxy phishing attack because an attacker may, for example, receive a particular code from an on-line user and then relay the code to a target website.

Accordingly, it may be desirable to develop one or more methods, systems, and/or apparatuses that may implement more effective and/or more efficient electronic authentication infrastructure, such as capable of authentication that may be more effective against phishing attacks, including proxy phishing attacks, for example.

Thus, as will be discussed in greater detail below, in an implementation, a login request from an application or like process, such as a web browser, as one particular example, may be electronically transformed into an authenticated session for an on-line user. Namely, as will be seen, in some instances, at least one user credential, such as a username, password, secret key, private key, specified label, etc. may, for example, be associated with an electronic system of a service accessible to a user over an electronic network. At times, such an association may prevent or preclude a user from electronically communicating user credentials or like information to an attacker, such as during a proxy phishing attack, for example. In some instances, an authenticated session may, for example, be forwarded to an approved and/or trusted client device, such as for a user to safely and/or securely access a service. For a proxy phishing attack that may be in progress, such as if a user already clicked on or followed a hyperlink to a phishing trap, for example, a user's attempt to login at the phishing trap may be blocked and/or the user may be redirected to an intended website and/or service, such as circumventing the phishing trap, as will also be seen.

Figure 2:
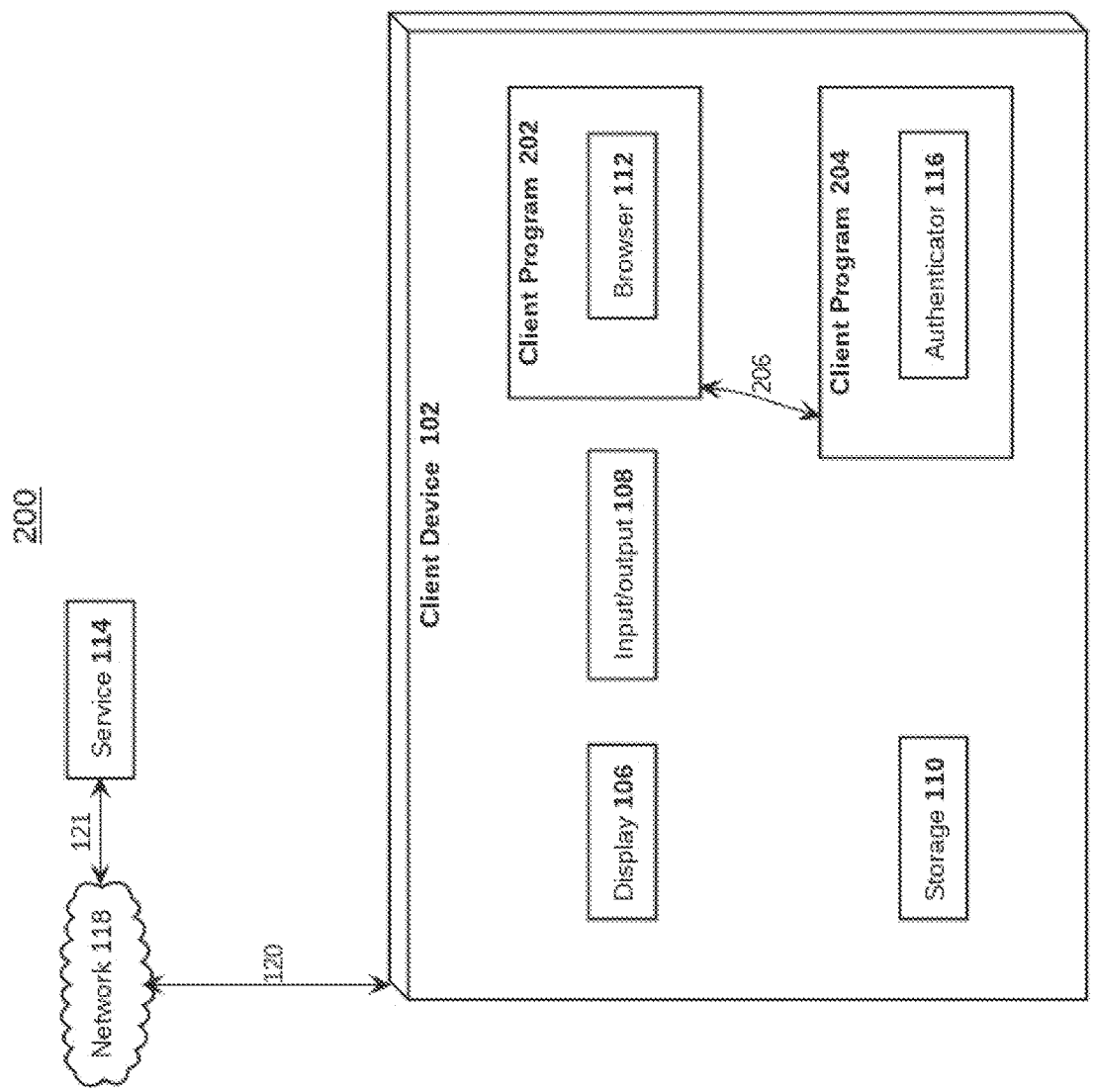
Figure 3:
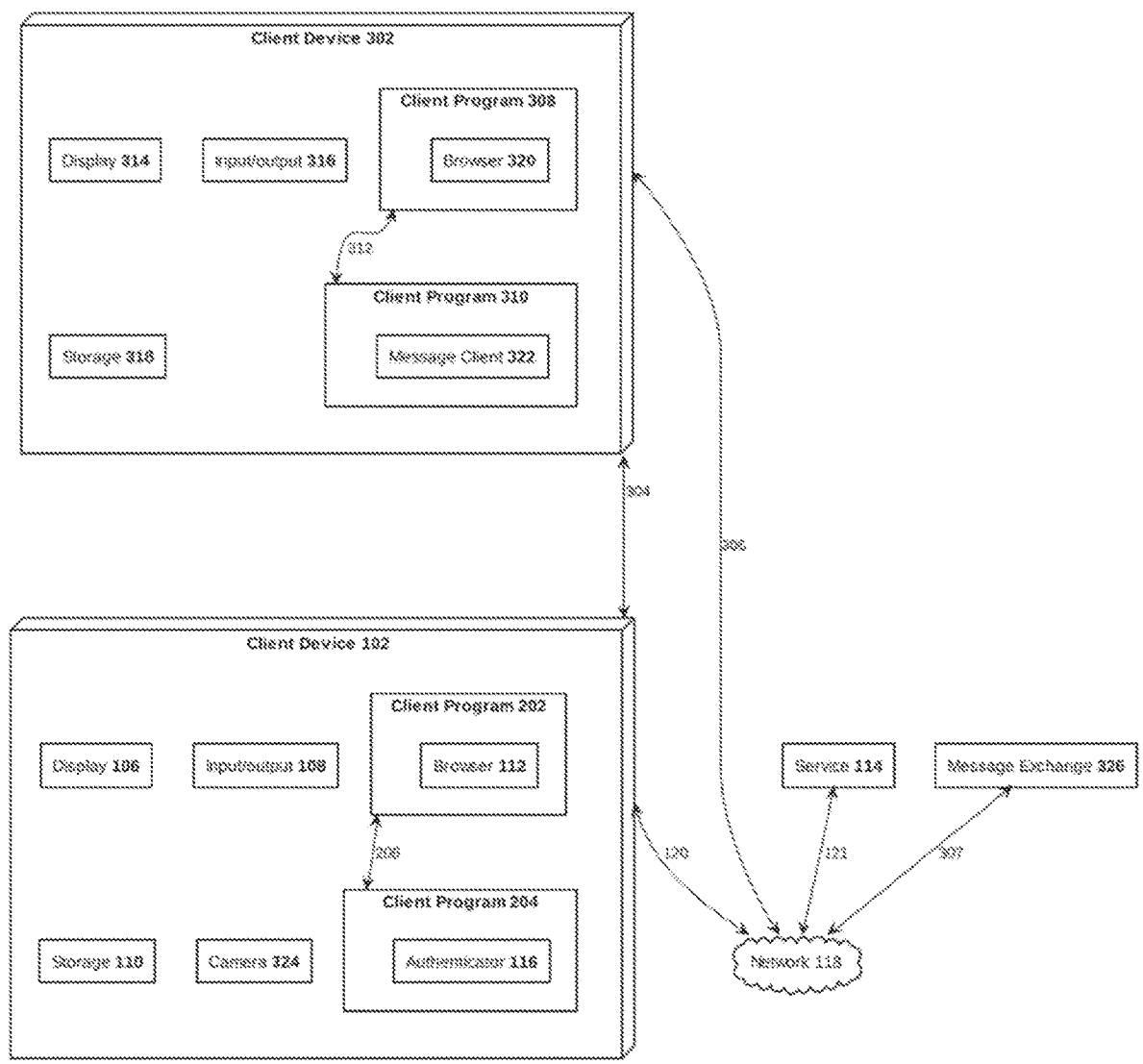

With this in mind, attention is drawn to FIGS. 1-3, which are schematic diagrams illustrating features associated with implementations of example operating environments that may be used, in whole or in part, to facilitate and/or support one or more operations and/or techniques for electronic authentication infrastructure. It should be noted that information acquired and/or produced, such as, for example, input signals, output signals, operations, results, etc. associated with example operating environments may be represented via one or more digital signals. For example, as was indicated and as discussed below, in some instances, one or more example operating environments may be implemented, at least in part, via a transport layer security (TLS) protocol, such as to facilitate and/or support more secure network communication between applicable devices on a network, which may include forwarding an authenticated session to one or more client devices. It should also be appreciated that even though one or more operations and/or techniques are illustrated or described concurrently or with respect to a certain sequence, other sequences or concurrent operations may be employed, such as without deviating from the scope of claimed subject matter.

In addition, although the description references particular aspects or features illustrated in certain other figures, one or more operations and/or techniques may be performed with other aspects or features. For example, in some instances, one or more aspects of an example operating environment 100 of FIG. 1 may comprise and/or be representative of one or more aspects of an example operating environment 200 of FIG. 2 and/or of one or more aspects of an example operating environment 300 of FIG. 3, and/or vice versa. Also, depending on an implementation, a single and/or double-sided arrow, if shown, may, for example, indicate a unidirectional flow, a bi-directional flow, or any combination thereof, such as with respect to signals, operations, processes, communications, and/or the like that may comprise and/or be represented via one or more digital signals. A direction of arrows may indicate an initiation of an interaction and/or process, such as operating a user interface, invoking computer-readable instructions, transmitting a request over an electronic network, or the like. Depending on an implementation, one or more of these or like interactions and/or processes may be bi-directional, such as involving multiple steps including, but not limited to, an electronic request and a reply, or an input and output.

It should also be noted that, even though a certain number of particular devices, networks, systems, aspects, features, links, etc. are illustrated, any number of suitable devices, networks, systems, aspects, features, links, etc. may be implemented herein. For example, as will be discussed in greater below, authenticator instructions and browser instructions may be linked together in a single computer program, may operate in separate computer programs on the same client device, may operate in separate computer programs on separate client devices, or the like. As another example, authenticator instructions may be linked into a service, for example, may operate as an independent process on the same client device as the service and/or as an independent process on a separate device, or the like. As yet another example, browser instructions and service may operate as separate computer programs on the same client device, for example, and/or as separate computer programs on separate devices, or the like. In addition, a computer program may have multiple roles for separate interactions, such that a computer program may comprise a browser for a first interaction with a user, for example, and an authenticator for a second interaction with the user.

Thus, according to an implementation, example operating environment 100 of FIG. 1 may comprise, for example, a client device 102 capable of executing particular computer-readable instructions, such as referenced herein via a client computer program, referenced at 104. Client device 102 may comprise any suitable components and/or circuitry so as to facilitate and/or support one or more operations and/or techniques discussed herein. For example, client device 102 may comprise a display 106, input/output 108 (e.g., a keyboard, mouse, touchscreen, etc.), storage 110 (e.g., a memory, buffer, etc.), as well as other components not shown herein, such as for ease of discussion. A particular example of a client computing device that may be used, in whole or in part, to facilitate and/or support one or more operations and/or techniques for electronic authentication infrastructure will be discussed below, such as with reference to FIG. 12.

As was indicated, in an implementation, client program 104 may comprise, for example, computer-readable code or instructions, referenced herein via browser instructions or "browser" at 112, such as for downloading and/or presenting electronic content from and/or allowing a user to interact with a service 114. In this context, "browser" refers to a computer program or computer-readable instructions within the computer program that may be used, at least in part, for accessing and/or presenting on-line content and/or facilitating and/or supporting electronic actions on a network, including, but not limited to, web browsers that may access any compatible and/or suitable network and/or service and/or applications programmed to access a particular network service. Here, "service" refers to a computer program or computer-readable instructions within the computer program that may control on-line content and/or electronic actions available to a user and is accessed by a browser over a network, including, but not limited to, one or more websites, application programming interfaces (APIs), or the like. For example, a service may comprise a single networked computing device with one or more protected electronic resources (e.g., electronic files, on-line accounts, etc.) and/or access control, or it may be a multitude of networked computing devices in any suitable arrangement of hardware and/or software, or any combination thereof. Particular examples of a service, protected resources, network communications, browser instructions, etc. will be discussed in greater detail below.

In an implementation, client program 104 may, for example, further include instructions for authenticating a user to service 114, referred herein to as authenticator instructions 116, or "authenticator." In this context, the term "authenticator" refers to a computer program or computer-readable instructions within the computer program that may be used, at least in part, to authenticate a user to one or more other computer programs, such as over a network, for example. As also illustrated, client device 102 may also be communicatively coupled to service 114 over a network 118, for example, such as via one or more communication links, referenced herein generally at 120 and 121, which may include one or more wired and/or wireless communications links, or any combination thereof. Likewise, particular examples of an authenticator and/or applicable authenticator instructions and/or processes will be discussed in greater detail below.

As will also be seen, in operative use, a user, such as via input/output 108, for example, may interact with client device 102 to operate client program 104 that may be programmed with computer-readable instructions to present a user interface to service 114, such as via browser 112 utilizing display 106. Typically, a user interface is a combination of output hardware (e.g., display, speaker, etc.) and/or input hardware (e.g., keyboard, mouse, touchscreen, microphone, etc.) and corresponding computer-readable instructions to enable and/or allow a user to interact with a client program. User interfaces are generally known and need not be described here in greater detail.

As also discussed below, in at least one implementation, using browser 112, a user may, for example, initiate an authentication process, such as by clicking on or opening a URL on display 106 using client program 104. Client program 104 may, for example, execute instructions so as to electronically connect to service 114 indicated by the URL and may display in a user interface of display 106 retrieved content, such as a login hyperlink, on-screen selection element, such as a button, etc., a list of user credentials already associated to service 114, and/or a hyperlink, button, etc. for creating a new user credential, etc. Particular examples of user credentials, associating user credentials to a service, creating a new user credential, etc. will be discussed in greater detail below. It should be noted that a user may electronically interact with service 114 via client program 104 before or after a login hyperlink, button, etc. is displayed. In some implementations, a number of user credentials associated to service 114 may be limited in suitable manner, and/or a new user credential may be created, such as automatically, as will also be seen.

Thus, depending on an implementation, a user may select an existing user credential to use, for example, or may activate a hyperlink, button, etc. to create a new user credential. In some instances, such as if a user chooses to create a new user credential, for example, client program 104 may provision a new user credential in a suitable manner and select it, such as for the user (e.g., without further user input). For example, in some instances, a new user credential may be provisioned by generating an asymmetric key pair comprised of a private key and a public key, the key pair meeting the requirements of an asymmetric cryptographic algorithm, such as Rivest-Shamir-Adleman (RSA), elliptic-curve (EC), or the like. A user credential may be stored by authenticator 116 as one or more digital signals in a suitable storage or like repository, such as storage 110, for example, on client device 102. As will be seen, a public key may be electronically transmitted to service 114, such as during an authentication process, for example. Thus, client program 104 may electronically communicate a login request to service 114, such as via network 118 using communications links 120 and/or 121, for example, with the selected user credential or a part thereof, such as, for example, a user credential public key, password, token, or the like. As will also be discussed below, service 114 may, for example, verify the login request and may respond appropriately. For example, if verification of a login request fails, meaning that authentication was unsuccessful, access to a protected resource (e.g., an on-line account, service, etc.) of service 114 may be denied. If an authentication session was successful, client program 104 may display a logged-in view in a user interface of display 106, for example, and a user may access a protected resource of service 114 via client program 104. Again, it should be understood that these are merely example implementations, and claimed subject matter is not limited in this regard.

Referring now to operating environment 200 of FIG. 2, in an implementation, client device 102 may execute instructions to authenticate an on-line user of client device 102, such as via two communicatively coupled client programs, for example, illustrated herein via a client program 202 and a client program 204. As illustrated, for this particular example, client program 202 may comprise, for example, computer-readable instructions, referenced herein via browser instructions or "browser" at 112, such as for downloading and/or presenting electronic content from and/or allowing a user to interact with a service 114. As also seen, client program 204 may, for example, include instructions for authenticating a user to service 114, herein referred to as authenticator instructions 116 or "authenticator." As will be discussed in greater detail below and as referenced generally via a communications link 206, client program 202 may be communicatively coupled with client program 204, such as to facilitate and/or support one or more operations and/or techniques discussed herein. Likewise, here, client device 102 may be communicatively coupled to service 114, such as over network 118 via communications links 120 and/or 121, for example.

Thus, as will be seen, in operative use, a user may be authenticated to service 114 via a single client device. For example, a user, such as via input/output 108, for example, may interact with client device 102 to operate client program 202 that may be programmed with computer-readable instructions to present a user interface to service 114, such as via browser 112 utilizing display 106. In at least one implementation, a user may, for example, initiate an authentication process, such as by clicking on or opening a URL on display 106 using client program 202. Client program 202 may, for example, execute instructions so as to electronically connect to service 114 indicated by the URL and may display in its user interface retrieved on-line content, such as a login hyperlink, button, etc. using display 106. Likewise, here, a user may interact with service 114 via client program 202, such as before or after a login hyperlink, button, etc. is displayed. If a user clicks on or activates a login hyperlink, button, etc., client program 202 may, for example, communicate with client program 204, such as via communications link 206, so as to invoke client program 204 with an identity and/or web location of service 114 to which the user intends to authenticate. Here, any suitable techniques may be employed. For example, client program 202 may request from a host operating system of client device 102 to start or initiate execution of client program 204 and/or to provide a parameter to client program 204. In some instances, a provided parameter may comprise, for example, a web address in the form of a URL of service 114, such as being displayed by client program 202.

In an implementation, client program 204 may then display a user interface on display 106 with a list of user credentials already associated to service 114, for example, and/or may present a hyperlink, button, etc. for creating a new user credential, if applicable. Depending on an implementation, a number of user credentials associated to service 114 may be limited in a suitable manner, for example, and/or a new user credential may be created automatically. Again, particular examples of user credentials, associating a user credential to a service, creating a new user credential, etc. will be discussed in greater detail below. Thus, here, a user may select an existing user credential, for example, or may click on or activate a hyperlink, button, etc., such as to create a new user credential. If a user chooses to create a new user credential, client program 204 may provision a new user credential, such as in a manner discussed above, for example, and may select it, such as for the user (e.g., without further user input). Client program 204 may then electronically communicate a login request to service 114 with the selected user credential. A service 114 may, for example, verify the login request and may respond appropriately. For example, if authentication was unsuccessful, access to a protected resource of service 114 may be denied. If an authentication session was successful, client program 202 may display a logged-in view in a user interface of display 106, for example, and a user may access a protected resource of service 114 via client program 202.

It should be noted that a variety of approaches to implement communication between and/or a transition from one client program (e.g., client program 202, etc.) to another (e.g., client program 204, etc.) and/or vice versa may be possible, and that claimed subject matter is not limited to a particular approach. As a way of illustration, for this particular example, service 114 may respond to a successful authentication by client program 204 with a URL, such as via an electronic communication via network 118 utilizing communications links 120 and/or 121, for example. Here, if an authentication session was successful, a logged-in view may be displayed in a user interface of display 106 using the same instance of client program 202 (e.g., within the same or currently opened user interface and/or browser), for example, and a user may access a protected resource of service 114 via the same instance of client program 202.

In a particular implementation, client program 204 may request from a host operating system of client device 102 to initiate or start a new instance of client program 202, such as via opening a new and/or separate user interface and/or browser application (not shown) on display 106, for example, and to provide an applicable URL to client program 204 as a parameter. If client program 204 invokes a new instance of client program 202 with an applicable URL, client program 202 may replace its user interface with on-line content retrieved using such a URL, for example, or it may display a second user interface with content retrieved using such a URL. As such, a phishing attack that may have been in progress by the prior user interface displayed by client program 202 may be prevented, such as by presenting a legitimate website and/or service to a user via circumventing a phishing trap while denying access to an attacker to a user's authenticated session with service 114 and/or protected resource.

Continuing with the above discussion, in some instances, to facilitate and/or support one or more techniques discussed herein, a suitable program credential may, for example be created. As used herein, "program credential" refers to a digital object or like functionality capable of uniquely identifying a particular client program. For example, while a user credential discussed above may be used, in whole or in part, to authenticate a user to a particular service, a program credential may be used, in whole or in part, to authenticate a client program (e.g., a client program 202, etc.) to an authenticator (e.g., authenticator 116, etc.). A program credential may not be needed or otherwise useful if a browser and authenticator comprise the same client program (e.g., client program 104 of FIG. 1, etc.), but may be needed and/or useful if a browser and authenticator comprise separate client programs and/or separate client devices, such as discussed below with reference to FIG. 3. An authenticator may, for example, maintain (e.g., in storage 110, etc.) a suitable content or data structure, such as a table, list, etc. specifying which program credentials are approved for use with which service.

For example, in some instances, such as at or upon user's clicking on or activating a displayed hyperlink, button, etc. after an authentication process has been initiated via a URL, as discussed above, client program 202 may check or determine if it has already created a program credential to be used, in whole or in part, for a communication with client program 204. It should be noted that one or more approaches may be used herein and that claimed subject matter is not limited to a particular approach. For example, in some instances, client program 202 may utilize, at least in part, an asymmetric key pair comprised of a private key and a public key, just to illustrate one possible implementation. If a program credential does not already exist, client program 202 may, for example, generate and/or provision a new program credential, as discussed above. For example, in at least one implementation, a program credential may be generated and/or provisioned by generating and/or storing an asymmetric key pair comprised of a private key and public key, the key pair meeting requirements of an asymmetric cryptographic algorithm, such as RSA, EC, etc. Likewise, here, a program credential may be stored by browser 112 on client device 102, such as in storage 110 as one or more digital signals, for example.

In an implementation, client program 202 may then use a private key of a program credential to digitally sign an applicable URL. For example, client program 202 may generate a sequence of bytes representing a URL, a public key of a program credential, a signature of the URL by the private key of the program credential, and/or any other suitable information or content that may be useful for validating a digital signature, such as a unique random number, a sequence number, a representation of a date and/or time, signature algorithm identifier and/or parameters, or the like. Client program 202 may, for example, subsequently invoke client program 204 with a digitally signed information representing an identity and/or web location of service 114 to which a user intends to authenticate as well as a public key of a program credential. Here, client program 202 may, for example, request from a host operating system of client device 102 to initiate execution or start client program 204 and to provide a parameter to client program 204, which may comprise such digitally signed information. Client program 204 then may display a user interface with a list of user credentials already associated to service 114, for example, and/or a hyperlink, button, etc. for creating a new user credential, if applicable. Likewise, here, depending on an implementation, a number of credentials associated to service 114 may be limited in suitable manner, and/or a new user credential may be created automatically.

Depending on an implementation, a user co-located with client device 102 may then select an existing user credential to use, for example, or may click on or activate a displayed hyperlink, button, etc. so as to create a new user credential. Similarly, here, if a user chooses to create a new user credential, for example, client program 204 may provision a new user credential and may select it, such as for the user (e.g., without further user input). Client program 204 may then electronically communicate a login request to service 114 with the selected credential. Service 114 may then verify a login request, for example, and may respond in a suitable manner. For example, in some instances, service 114 may respond to a successful authentication by client program 204 with a URL for a protected resource associated with service 114. Client program 204 may also check or determine if a public key of a program credential is approved, for example. A particular example of an approval process will be discussed in greater detail below with reference to FIG. 11. If it is approved, client program 204 may, for example, request from a host operating system of client device 102 to return the URL to the same instance of client program 202 that invoked client program 204 (e.g., the same user interface, browser, etc.). In some instances, such as if a program credential is not approved, for example, client program 204 may request from a host operating system of client device 102 to initiate execution or start a new instance of client program 202 (e.g., present a new user interface, open a new browser, etc.) and to provide an applicable URL as a parameter. It should be noted that subject matter is not limited to a particular approval approach for a program credential. For example, in some instances, service 114 may provide a suitable network interface for client program 204 so as to request and/or determine whether a specific public key is already approved. As another example, service 114 may electronically access and/or obtain a list of approved public keys to use, such as while checking a public key of a program credential, for example.

Thus, continuing with the above discussion, if client program 204 invokes a new instance or the same instance of client program 202 with an applicable URL and/or client program 202 replaces its user interface with on-line content retrieved using this URL, for example, a phishing attack that may have been in progress by the prior user interface of client program 202 may be circumvented, such as in a similar fashion. As was indicated, if a phishing attack was in progress, an attacker may, for example, be precluded from receiving access to a user's authenticated session with service 114 and/or associated protected resource. Here, by checking if a program credential is approved, such as via client program 204, for example, and communicating a URL to an approved program, an authentication process may implement a more useful and/or user-friendly user interface for client program 202. More specifically, a user may be able to proceed with an authenticated session in the same instance of client program 202 that was already open, for example, while a non-approved instance of client program 202 may be precluded from continuing with the session. Likewise, if authentication was successful, client program 202 may display a logged-in view, such as on display 106, for example, and a user may access a protected resource of service 114 via client program 202.

It should be noted that, in some instances, more than one client device may, for example, be employed, at least in part, to authenticate an on-line user to a particular service, such as service 114. For example, as illustrated in FIG. 3, in an implementation, electronic authentication infrastructure may include operating environment 300 comprising client device 102 and a client device 302. Here, as also seen, client device 102 and client device 302 may be communicatively coupled with each other, such as directly via a communications link 304, for example, and/or indirectly, such as via network 118, such as utilizing one or more communications links 120, 121, 306, and/or 307. Likewise, here, communications links 120, 121, 304, 306, and/or 307 may comprise, for example, one or more wired and/or wireless communications links, or any combination thereof. Thus, as also seen in this example, client device 102 may be capable of executing computer-readable instructions for client programs 202 and/or 204, for example, and client device 302 may be capable of executing computer-readable instructions for client programs 308 and/or 310. Similarly to client programs 202 and 204 of client device 102, client program 308 may, for example, be communicatively coupled with client program 310, such as via a communications link 312 so as to facilitate and/or support one or more operations and/or techniques discussed herein.

In at least one implementation, similarly to client device 102, client device 302 may comprise, for example, a display 314, input/output 108 (e.g., a keyboard, mouse, touchscreen, etc.), storage 318 (e.g., a memory, buffer, etc.), as well as other components not shown herein, such as for ease of discussion. Thus, depending on an implementation, client device 302 may be the same type or a different type of a client device. For example, in some instances, client device 302 may comprise a desktop computer, and client device 102 may comprise a mobile device, though claimed subject matter is not so limited. Typically, "mobile communication device" or simply "mobile device" refers to any kind of special purpose computing platform and/or apparatus that may from time to time have a position or location that changes. As a way of illustration, mobile devices may include, for example, cellular telephones, smart telephones, personal digital assistants (PDAs), laptop computers, personal entertainment systems, tablet personal computers (PC), personal audio or video devices, personal navigation devices, or the like. It should be appreciated, however, that these are merely examples of mobile devices that may be used, at least in part, to implement one or more operations and/or techniques for electronic authentication infrastructure, and that claimed subject matter is not limited in this regard. Again, a particular example of client computing devices that may be used, in whole or in part, to facilitate and/or support one or more operations and/or techniques for electronic authentication infrastructure will be discussed below, such as with reference to FIG. 12.

As also illustrated via browser instructions or "browser" at 320, in an implementation, client program 308 may include, for example, computer-readable instructions for downloading and/or presenting on-line content from, and/or allowing a user to interact with, service 114. As also seen, client program 308 may further include, for example, computer-readable instructions for transmitting and/or receiving one or more electronic messages using a message exchange program or process, referenced herein via a message client at 322. In this context, "message exchange" refers to a process, such as implemented via a computer program, for example, capable of facilitating and/or supporting electronic communication with one or more other devices, client or otherwise, through wireless and/or wired transmission and/or receipt of information according to one or more message communication protocols. For example, depending on an implementation, message communication protocols may include a message exchange-type pattern protocol, such as the Hypertext Transfer Protocol (HTTP), a one-way pattern protocol, such as the User Datagram Protocol (UDP), just to illustrate a few non-limiting examples, or any combination thereof. Thus, message client 322 may, for example, be capable of facilitating and/or supporting electronic communication via an electronic mail, instant and/or text messaging, or any other kind of message-type or like communication between computing devices, client or otherwise. As also illustrated, client device 102 may further comprise, for example, a camera, referenced herein at 324, such as to facilitate and/or support capturing digital media, such as a digital image of a bar code, as one example, on display 314 as part of a user authentication process, as will be seen.

Thus, in an implementation, similarly to operating environments 100 and/or 200 of FIGS. 1 and/or 2, respectively, in operative use, a user may, for example, interact with client device 302 to operate client program 308 that may be communicatively coupled to service 114 over network 118 and programmed with computer-readable instructions to present a user interface to service 114. A user may also interact with client device 102, for example, to operate client program 204 that may be communicatively coupled to service 114 over network 118 and programmed with computer-readable instructions to authenticate the user to service 114.

For example, here, a user may initiate an authentication process by opening a URL in client program 308 on client device 302. Client program 308 may connect to service 114 indicated by the URL and may display in its user interface retrieved content including a login hyperlink, button, etc. A user may interact with service 114 via client program 308 before or after a login hyperlink, button, etc. is displayed. If a user initiates login activity by clicking a login button, hyperlink, etc. displayed by client program 308, client program 308 may generate and display a visual code on display 314, as will be discussed below. There are a variety of ways to implement this, but as an illustration, in at least one implementation, a visual code may include, for example, a quick response (QR) code comprising a machine-readable encoding of information or content. One or more signals indicative of user input may, for example, be received and/or processed by a suitable processor (not shown) so as to activate camera 324 on client device 102 to create a photographic image of a visual code. In a similar manner, one or more signals indicative of user input may activate client program 204 on client device 102 with instructions to decode a visual code to extract its content, for example, such as using one or more appropriate decoding techniques. Client device 102 may, for example, retrieve content from service 114 specified by a URL extracted from a visual code. Client program 204 then may display a user interface with a list of credentials already associated to service 114, for example, and a hyperlink, button, etc. for creating a new credential. Depending on implementation, a number of credentials associated to service 114 may be limited in a suitable manner, or a new credential may be generated automatically, such as discussed herein.

In an implementation, a user then may select an existing credential to use, for example, or may activate a hyperlink, button, etc. to create a new credential. If a user chooses to create a new credential, for example, client program 204 may provision a new credential and select it, such as for the user, as was indicated. Client program 204 then may electronically transmit a login request to service 114 with selected credential. Service 114 then may verify a login request, for example, and may respond accordingly. As an illustration, for this example implementation, service 114 may, for example, respond to a successful authentication session by client program 204 with a URL, such as for a protected resource for service 114. Client program 204 may request from a host operating system of client device 102 to initiate or start a new instance of client program 202 and to provide the URL as a parameter. Client program 204 may invoke a new instance or use the same instance of client program 202 with a provided URL, for example, and client program 202 may replace its user interface with content retrieved using such a URL. As such, a user may be authenticated to service 114 and may access an associated protected resource, for example, but this access may be via client device 102, whereas the user started a login process on client device 302.

In at least one implementation, a user, for example, may transfer an authenticated session from client device 102 to client device 302. It should be understood that there are a number of possible ways to transfer an authenticated session, such as via e-mail, instant message, or any other type of message exchange service and/or process. As an illustration using an e-mail approach, a user may, for example, click on or select a hyperlink, button, etc. in a user interface presented by client program 202 on client device 102 to receive an e-mail hyperlink to be used to transfer an authentication session to client device 302. Client program 202 may electronically transmit a request to generate and send an e-mail hyperlink to service 114. Service 114 may generate a URL, for example, and may send it to a message exchange 326. A user may then open client program 322 on client device 302, which may, for example, present a user interface with one or more e-mail messages retrieved from message exchange 326. If a user clicks on a received hyperlink, client program 322 may, for example, request from a host operating system to start execution of a new instance of client program 320 with a specified URL. Client program 320 on client device 302 then may retrieve content from service 114 specified by such a URL, for example, and may display a logged-in view to a user. A user then may proceed to access a protected resource with client device 302.

It should be noted that if a phishing attack was in progress after a user started an authentication activity on client device 302, such as if a hyperlink was to a phishing trap, for example, and the phishing trap presented a visual code to login to intended service (e.g., service 114, etc.), this approach may circumvent the phishing trap. Thus, in some instances, such an approach may result in a user accessing a protected resource of an intended service (e.g., service 114, etc.) on client device 302, such as without granting access to an attacker, for example, and/or without a user having to make assertions regarding a displayed URL. In some instances, such as if a phishing trap presented a visual code to login to its own service, for example, a user may be able to complete an authentication process by being logged in to the phishing trap, but an attacker may not gain authenticated access to a protected resource at the intended service (e.g., service 114, etc.). If authentication was successful, client program 308 may display a logged-in view, for example, such as for a user to access a protected resource of a service 114, such as via a client program 308.

In some instances, a user may initiate an authentication process by opening a URL in client program 308 on client device 302, for example. Client program 308 may electronically access and/or connect to service 114 indicated by the URL, for example, and may display in its user interface retrieved content, such as a login hyperlink, button, etc. A user may interact with service 114 via client program 308 before or after a login hyperlink, button, etc. is displayed, as was indicated. If a user clicks on or activates a login hyperlink, button, etc., client program 308 may check if it has already created a program credential, for example, and if the program credential does not already exist, client program 308 may generate a new program credential. There are a variety of ways to implement this and claimed subject matter is not limited to a particular approach. As an illustration, for this example implementation, client program 308 may, for example, generate an asymmetric key pair comprised of a private key and a public key, such as also discussed above. As will also be seen, in some instances, client program 308 may associate a new program credential with a particular service. Client program 308 then may use a private key of a program credential to digitally sign a URL.

As an illustration, client program 308 may, for example, generate a sequence of bytes representing a URL, a public key of a program credential, a signature of the URL by the private key of the program credential, and/or any other suitable information or content that may be useful for validating a digital signature, such as a unique random number, a sequence number, a representation of a date and/or time, signature algorithm identifier and/or parameters, or the like. Subsequently, client program 308 may request a new message channel, such as from a message exchange 326, for example. There is a variety of ways to implement a message channel including, but not limited to, a temporary e-mail account, instant message queue, or the like. For purposes of illustration, message exchange 326 may, for example, create a new channel representing an instant message queue. It should be noted that message exchange 326 may be selected by client program 308 and may comprise any suitable message exchange, which may or may not be the same as a message exchange used in a session transfer process described above.

Continuing with the above discussion, according to an implementation, client program 308 may, for example, generate a secret key that may be used, in whole or in part, for encrypting one or more electronic messages between client program 308 on client device 302 and client program 204 on client device 102. Client program 308 then may encrypt a signed URL with a secret key to generate an encrypted message, for example, and may transmit the encrypted message to message exchange 326. Then, client program 308 may generate a machine-readable code representing a channel location and secret key, for example, and may display the visual code on display 314. There are a variety of ways to implement this, but as an illustration, a visual code may be a quick response (QR) code, such as a machine-readable encoding of information or content. Here, input indicative of a user activating camera 324 may, for example, be received on client device 102 so as to create a photographic image of a visual code. Likewise, a user may, for example, activate client program 204 on client device 102 with instructions to decode a visual code to extract its content. Client program 204 may then access and/or retrieve a message from message exchange 326 as specified by information or content extracted from a visual code, for example.

In an implementation, client program 204 may decrypt a received message, such as using a secret key extracted from a visual code, for example. It should be noted that there is a variety of ways to encrypt and/or decrypt a message and/or ensure its integrity. For example, in an implementation, a message may be encrypted and/or decrypted using an Advanced Encryption Standard (AES) cipher in Cipher Block Chaining-message authentication code (CCM) mode, though claimed subject matter is not so limited. Thus, client program 204 may, for example, retrieve content from service 114 specified by a URL extracted from a received and/or decrypted message. Client program 204 then may display a user interface with a list of credentials already associated to service 114, and a hyperlink, button, etc. for creating a new credential. Depending on an implementation, a number of credentials associated to service 114 may be limited in a suitable manner, for example, or a new credential may be created automatically. Similarly to the above, a user then may select an existing credential to use, for example, or may click on or activate a hyperlink, button, etc. to create a new credential. In some instances, such as if a user chooses to create a new credential, for example, client program 204 may provision a new credential and may select it, such as for the user (e.g., without further user input).

According to an implementation, client program 204 then may electronically transmit a login request to service 114 with a selected user credential. Service 114 may verify a login request, for example, and may respond in a suitable manner. As an illustration, for this implementation, service 114 may, for example, respond to a successful authentication by client program 204 with a URL, herein called "a forward URL." Client program 204 may check if a public key of a program credential is approved. There is a variety of ways to implement approval of program credentials, and claimed subject matter is not limited to a particular approach, as was indicated. In some instances, service 114 may provide a network interface for client program 204 to request whether a specific public key is already approved, for example, or to get a list of approved public keys to use while checking a public key of a particular program credential. If it is approved, client program 204 may encrypt a forward URL with a secret key, for example, and may electronically transmit the encrypted forward URL to message exchange 326.

In an implementation, client program 308 on client device 302 may retrieve a message from message exchange 326, for example, may decrypt the message with a secret key to extract a forward URL, then may retrieve content at location specified in the forward URL. Client program 308 on client device 302 then may display a logged-in view. If a program credential is not approved, client program 204 on client device 102 may request from a host operating system to initiate execution or start a new instance of client program 202, for example, and may specify a forward URL as a parameter. Client program 202 may retrieve content specified by a URL, for example, and may display a logged-in view. A user may then transfer an authenticated session from client program 202 on client device 102 to client program 320 on client device 302, such as using the above-referenced approach. Thus, a user may be able to access a protected resource of service 114, such as via client program 320 on client device 302, just to illustrate one possible implementation.

Thus, as discussed herein, by checking if a program credential is approved, such as via client program 204, for example, and communicating a forward URL to an approved program, an authentication process may implement a more useful and/or user-friendly user interface for client program 308. More specifically, a user may be able to proceed with an authenticated session in the same instance of client program 308 that was already open, for example, while a non-approved instance of client program 308 may be precluded from continuing with the session. Likewise, if authentication was successful, client program 308 may display a logged-in view, such as on display 314, for example, and a user may access a protected resource of service 114 via client program 308.

Figure 4:
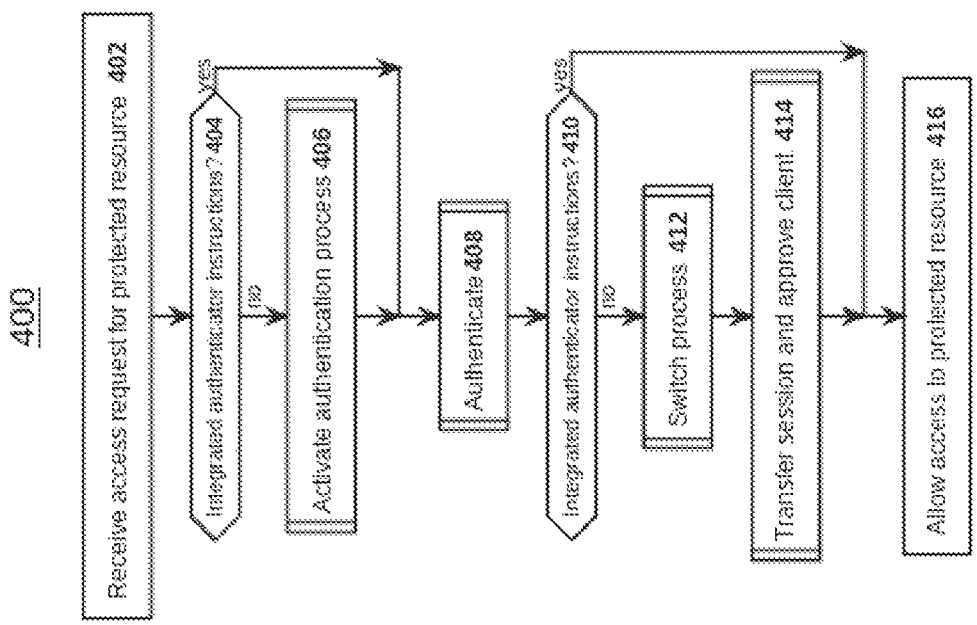
FIG. 4 is a flow diagram illustrating an implementation of an example process for electronic authentication infrastructure.

With this in mind, attention is now drawn to FIG. 4, which is a flow diagram illustrating an implementation of an example process 400 that may be performed, in whole or in part, to facilitate and/or support one or more operations and/or techniques for electronic authentication infrastructure. As was indicated, at times, process 400 may be implemented, at least in part, via one or more client devices, such as client devices 102 and/or 302 of FIG. 1-3 or any combination of a client device and a server device. It should be noted that information acquired or produced, such as, for example, input signals, output signals, operations, results, etc. associated with example process 400 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 400 may, for example, begin at operation 402 with receiving access request, such as for a protected resource. As was indicated, a protected resource may comprise, for example, any suitable file, system, or like electronic environment with electronically controlled access, such as via a service. For example, a protected resource may comprise an on-line bank account, e-mail account, work computing system and/or file, accessed via a website and/or browser or via a dedicated software application, such as a desktop software application, mobile software application, or the like. In some instances, access request may, for example, be received electronically, such as via a network (e.g., network 118 of FIGS. 1-3, etc.) and may be indicative of a user's selection of a bookmark in a browser, or a user clicking on a hyperlink in an e-mail, advertisement, host application, etc., a user entering a URL into a browser or opening a desktop application or native application and attempting to access a protected resource, clicking a login button or hyperlink presented to a user by a browser or other application, or the like.

At operation 404, it may, for example, be determined whether authenticator instructions are integrated, such as into a single client computer program or process. For example, authenticator instructions may be determined to be integrated if a client device operates a particular client computer program or process capable of executing both authenticator instructions and browser instructions (e.g., client program 104 of FIG. 1). Thus, if yes, example process 400 may, for example, proceed to operation 408. If no, however, meaning that if it is determined that a client device operates separate client computer programs for executing authenticator instructions and browser instructions (e.g., client programs 202 and 204 of FIGS. 2 and 3 and/or client program 308 of FIG. 3), example process 400 may proceed to operation 406.

At operation 406, an authentication process may, for example, be activated. For example, here, a client program comprising browser instructions may request from a host operating system of an associated client device to start or initiate execution of a client program comprising authenticator instructions and may provide a suitable parameter (e.g., a URL of a service, etc.) to the client program comprising authenticator instructions, such as discussed above with reference to FIGS. 2 and 3. A particular example of activating authentication process will be discussed in greater detail below with reference to FIG. 5.

Having activated an authentication process, example process 400 may, for example, proceed to operation 408, such as to authenticate an on-line user to a particular service. For example, a client device associated with a user may execute computer-readable code or instructions via a host and/or remote client program, such as to authenticate an on-line user via one or more communications networks (e.g., network 118 of FIGS. 1-3, etc.). Likewise, a particular example of authenticating an on-line user that may be implemented, at least in part, in connection with operation 408, for example, will be discussed in greater detail below, such as with reference to FIG. 9.

With regard to operation 410, a determination may, for example, be made as to whether authenticator instructions are integrated into a single client computer program or process, such as similarly to operation 404 discussed above. If yes, example process 400 may proceed to operation 416 so as to allow access to a protected resource, as will also be seen. If it is determined that authenticator instructions are not integrated, such as with browser instructions in a single client computer program or process, for example, example process 400 may proceed to operation 412 so as to switch or transition from authentication instructions to browser instructions. As was indicated, depending on an implementation, this may be implemented via invoking a new instance of a client program executing browser instructions, for example, or the same instance of the client program may be utilized. Likewise, a particular example of a switch or transition from authentication instructions to browser instructions will be discussed in greater detail below, such as with reference to FIG. 10.

At operation 414, an authenticated session may, for example, be transferred, such as to one or more client devices, for example, in connection with approving a client program. Likewise, a particular example of transferring an authenticated session in connection with approving a client program will be discussed in greater detail below, such as with reference to FIG. 11.

Finally, at operation 416, such as if an authentication session was successful, example process 400 may, for example, allow access to a protected resource. For example, as discussed above, a client program may display a logged-in view in a user interface of an associated display, and an on-line user may access a protected resource of a service to which the user intended to authenticate, such as via the client program.

It should be noted that one or more failure conditions and/or decisions of example process 400 are not illustrated herein, such as for ease of discussion, but may nevertheless be part or example process 400, as appropriate and/or applicable, meaning that a failure at a particular operation of example process 400 may prevent example process 400 from completing that operation, one or more subsequent operations, and/or process 400. As a way of illustration, if operation 408 (e.g., authentication) fails, for example, example process 400 may terminate.

Figure 5:
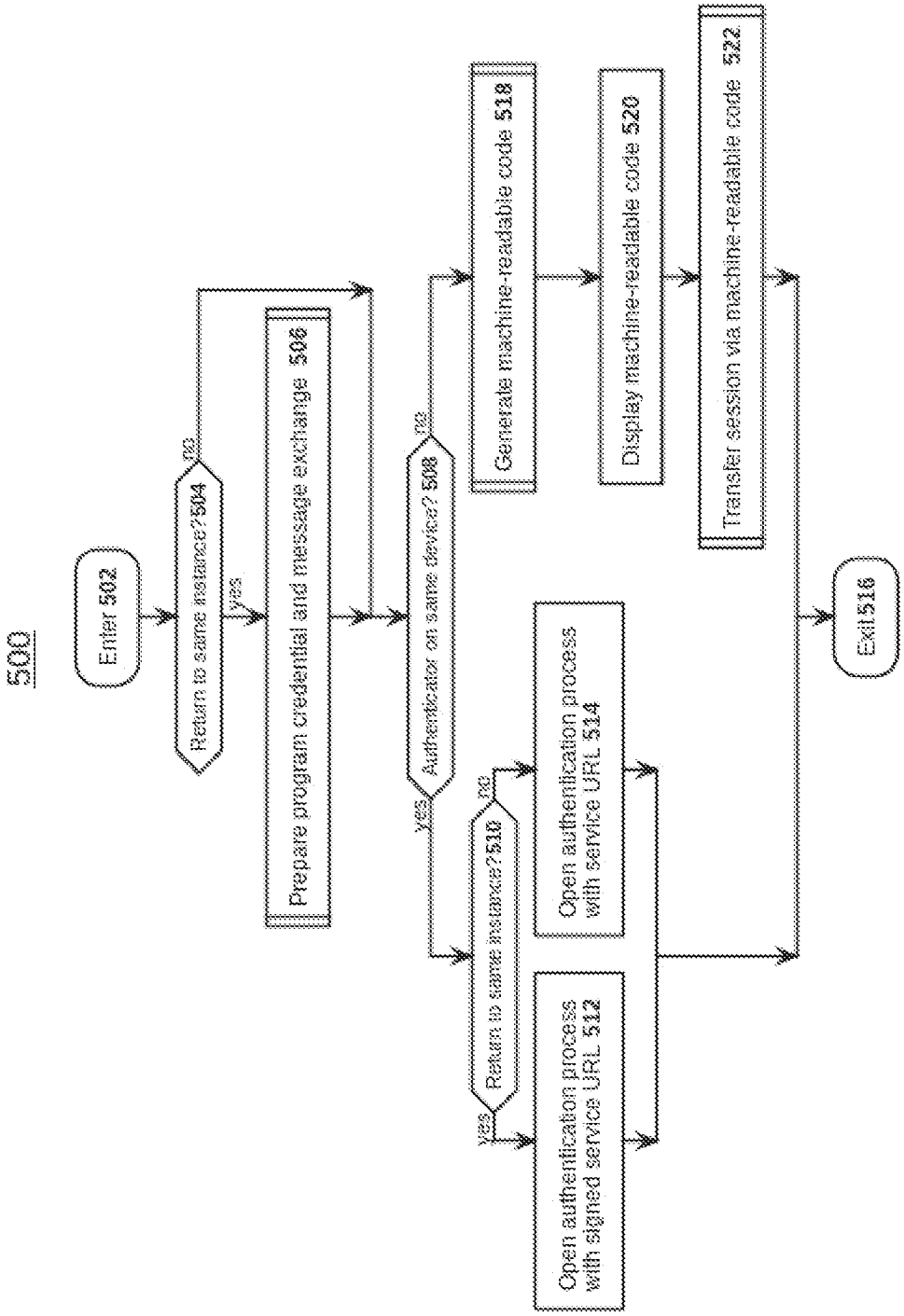
FIG. 5 is a flow diagram illustrating an implementation of an example process for activating an authentication process.

Referring now to FIG. 5, which is a flow diagram illustrating an implementation of an example process 500 that may be performed, in whole or in part, to facilitate and/or support one or more operations and/or techniques for electronic authentication infrastructure. In some instances, example process 500 may be performed, in whole or in part, to activate an authentication process, such as discussed above with reference to operation 406 of FIG. 4, for example. Likewise, it should be noted that information acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as referenced generally at 502, example process 500 may, for example, begin and may proceed to operation 504, at which a decision may be made as to whether to return a user to the same instance of a client program. For example, as discussed above, this operation may be implemented and/or useful if authenticator instructions are executed in a separate process, such as discussed above with reference to FIGS. 2 and/or 3. Namely, as was indicated, if authentication instructions are initiated via a first instance of a client program (e.g., via browser 112 of client program 202 of FIG. 2 and/or via browser 320 of client program 308 of FIG. 3), for example, here, the first instance of the client program may make a determination as to whether to return an on-line user to the same authentication process. For example, in some implementations, such as discussed in connection with FIGS. 2 and 3, a client program 202 may start or switch to a client program 204 for authentication. After client program 204 authenticates a user to service 114, it may, for example, transfer an authenticated session to the same instance of client program 202 that initiated the authentication activity, which is the same client program 202 where the user attempted to access a protected resource. Optionally, or client program 204 may, for example, request a host operating system on client device 102 to start a new instance of client program 202 to which it will transfer an authenticated session. In at least one implementation, a decision whether to transfer an authenticated session to the same instance of a client program that initiated an authentication activity or to a new instance of a client program may include evaluation of two conditions. For example, it may be determined if client program 202 requested an authenticated session to be transferred back to it, which may be indicated by signing a service URL with a private key of its program credential, just to illustrate one possible implementation. In addition, it may be determined if a program credential of client program 202 is approved. Particular examples of a client program transferring an authenticated session to the same instance of a client program that initiated an authentication activity and approving a client program will be discussed in greater detail below, such as with reference to FIGS. 10 and 11.

Continuing with the above discussion, if no, example process 500 may, for example, proceed to operation 508. If a decision at operation 506 is to return a user to the same instance of a client program, however, example process 500 may proceed to operation 506 to prepare a program credential and message exchange. A particular example implementation of preparing a program credential and message exchange will be discussed in greater detail below, such as with reference to FIG. 6, for example.

With regard to operation 508, it may be determined whether an authenticator is on the same client device. For example, as discussed above, if authentication activity involves a single client device (e.g., client device 102 of FIG. 1), it may be determined that authenticator is on the same client device. If yes, example process 500 may proceed to operation 510. Here, a decision may, for example, be made as to whether to return a user to the same instance of a client program, such as similarly to operation 504 discussed above. Thus, if an authenticator is on the same client device and a decision is made to return a user to the same instance of a client program, authentication process may be opened or initiated with a service URL, as referenced at 512. A service URL may, for example, identify a service to which a user intends to authenticate to access a protected resource. At least one possible format for a service URL may include the following: "https://example.com:443", though claimed subject matter is not so limited. A general syntax for URL is described by the Institute of Electrical and Electronics Engineers (IEEE) in RFC 1738 (and/or later updates). It should be noted that, depending on an implementation, valid and/or non-valid URLs, such as described and/or defined ion RFC 1738, for example, may be utilized as service URLs, in whole or in part.

It should be noted that, even though the terms "URL," "service URL," or like terms are employed herein, such as for ease of discussion, any other suitable web locator, service location, etc. comprising a sequence of bytes indicative of a particular service (e.g., service 114, etc.) to which a client program (e.g., client program 204, etc.) may intend to authenticate may be used herein, in whole or in part. Similarly, the term "signed service URL" is used herein for ease of discussion and should be constructed broadly and may include any suitable digitally signed web locator, service location, etc., such as by a client program (e.g., client program 202, 308, etc.) using a private key of its program credential, for example.

In an implementation, if it is determined that an authenticator is on the same client device, for example, but a decision is made to not return a user to the same instance of a client program, an authentication process may be opened or initiated with a service URL, as referenced at 514. As further referenced at 516, subsequently, example process 500 may exit or terminate at operation 516, such as to return to example process 400 of FIG. 4 (e.g., continue to operation 408, etc.), for example.

However, if it is determined that authenticator instructions may be on a different client device (e.g., client device 102 of FIG. 3), example process 500 may proceed to operation 518, such as to generate a machine-readable code, for example, or any other suitable functionality capable of facilitating and/or supporting communication between a service and one or more client devices. For example, in some instances, here, a service may employ a push, pull, or like technology (e.g., a notification, etc.). It should be noted that, in some instances, it may be useful to generate and/or display a machine-readable code even if an authenticator is present on the same client device. In this context, "machine-readable code" refers to content encoded and/or represented via a format capable of being displayed and/or processed, such as recognized or "read," by a computing device. To illustrate, a machine-readable code may include, for example, a bar code (e.g., matrix, linear, etc.), Quick Response (QR) code, text recognizable with Optical Character Recognition (OCR), magnetic stripe, Near Field Communication (NFC), or the like. Here, a machine-readable code may, for example, facilitate and/or support establishing a communication channel between client devices, such as a first client device (e.g., client device 302 of FIG. 3, etc.) and a second client device (e.g., client device 102 of FIG. 3, etc.). Claimed subject matter is not so limited, of course. For example, in some instances, a communication channel between client devices may be established via Near Field Communication (NFC), Bluetooth, Wi-Fi, universal serial bus (USB), or the like, or any combination thereof. A particular example implementation of a process for generating a machine-readable code will be discussed in greater detail below, such as with reference to FIG. 7.

Thus, having generated machine-readable code, in an implementation, such a code may, for example, be displayed and/or indicated in a suitable manner, as referenced generally at operation 520. For example, a machine-readable code may be displayed on a user interface of a display of associated client device (e.g., display 314 of client device 302 of FIG. 3, etc.), just to illustrate one possible implementation. At times, a displayed machine-readable code may, for example, be used, at least in part, to transfer an authenticated session, such as from one client device to another, as referenced at operation 522. A particular example implementation of a process of transferring an authenticated session via a machine-readable code will be discussed in greater detail below, such as with reference to FIG. 8. Likewise, here, example process 500 may exit or terminate at operation 516, such as to return to example process 400 of FIG. 4 (e.g., continue to operation 408, etc.), for example.

Figure 6:
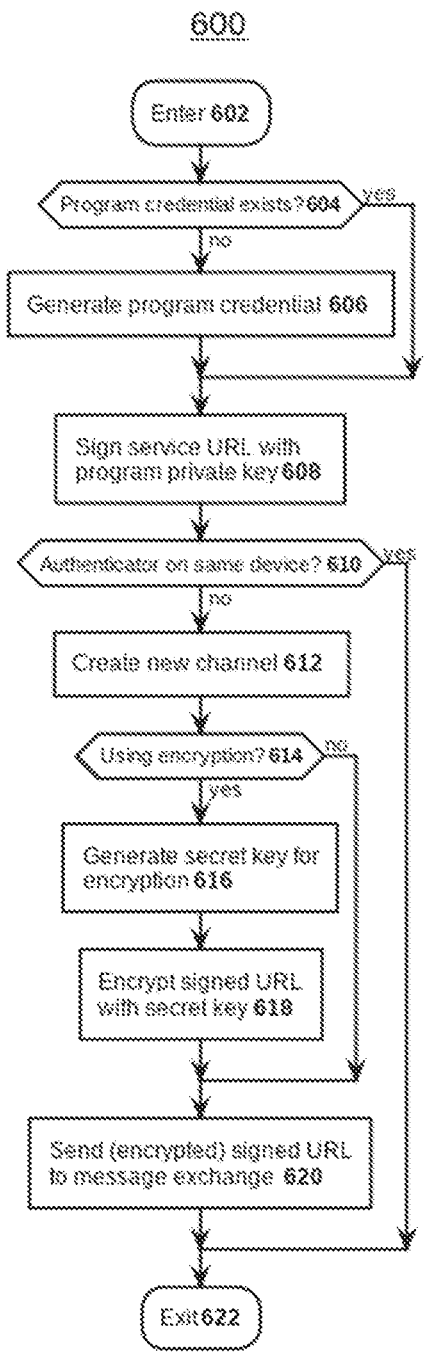
FIG. 6 is a flow diagram illustrating an implementation of an example process for preparing a program credential and message exchange.

As was indicated, FIG. 6 is a flow diagram illustrating an implementation of an example process 600 that may be performed, in whole or in part, to facilitate and/or support one or more operations and/or techniques for preparing a program credential and message exchange, such as implemented in connection with electronic authentication infrastructure. Likewise, it should be noted that information acquired or produced, such as, for example, input signals, output signals, operations, results, etc. associated with example process 500 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 600 may begin, such as at operation 602, for example, and may proceed to operation 604 so as to determine whether a program credential exists. As was discussed above, this operation may be implemented and/or may be useful if a decision was made to return a user to the same instance of a client program (e.g., at operation 510 of FIG. 5, etc.), such as by the end of a successful authentication session, for example. Such a determination may, for example, be made via accessing a suitable memory (e.g., storage 110 for client program 202 of FIG. 1, storage 318 for client program 308 of FIG. 3, etc.) to retrieve a file and/or setting into which a program credential may be stored. If a program credential has not yet been generated, or has been generated and subsequently erased, a file and/or setting will be missing or empty, thus, indicating that the program credential does not exist, for example.

If yes, meaning that if an applicable program credential is found, example process 600 may proceed to operation 608, discussed below. If it is determined, however, that a program credential does not exist, such as via an approach discussed above, example process 600 may generate a new program credential, as referenced at operation 606. Here, a new program credential may comprise, for example, any suitable characteristic or object, such as a token, secret key, asymmetric keypair (e.g., a private key and a public key), or the like. For example, a program credential may be provisioned by generating an asymmetric key pair comprised of a private key and public key, the key pair meeting the requirements of an asymmetric cryptographic algorithm such as RSA, EC, etc. A program credential may, for example, be stored by a suitable client program (e.g., client program 202 on storage 110 on client device 102, client program 320 on storage 318 on client device 302, etc.).

With regard to operation 608, a service URL (e.g., service URL of operation 514 of FIG. 5, etc.) may, for example, be signed with a private key of a program credential. Likewise, here, a service URL may, for example, be signed with a private key so as to comprise a digital certificate comprised of a service URL, a public key of a program credential, a signature of the URL by the private key of the program credential, and/or any other suitable information or content that may be useful for validating a digital signature, such as a unique random number, a sequence number, a representation of a date and/or time, signature algorithm identifier and/or parameters, or the like. Here, any suitable format may be utilized, in whole or in part, such as X.509 public key certificate, just to illustrate one possible implementation.

Example process 600 may then proceed to operation 610, such as to determine whether an authenticator is on the same client device, for example, such as similarly to operation 508 of FIG. 5. If yes, example process 600 may proceed to operation 622, such to exit or terminate at operation 622 (e.g., return to process 500 of FIG. 5). If it is determined, however, that an authenticator is on a separate client device (e.g., client device 102 of FIG. 3, etc.), an additional step may, for example, be taken so as to enable a client program on a first client device (e.g., client program 308 on client device 302 of FIG. 3, etc.) to communicate with a client program on a second client device (e.g., client program 204 on client device 102 of FIG. 3, etc.). For example, as referenced via operation 612, a new communication channel may be created. More specifically, in some instances, it may be useful for a communication channel to be bi-directional, meaning that a first client program (e.g., client program 308 of FIG. 3, etc.) may be capable of electronically communicating a message that may be received by a second client program (e.g., client program 204 of FIG. 3, etc.), and vice versa. Thus, a client program may be capable of communicating using one or more channel types. By way of example but not limitation, a service may include computer-readable instructions that may implement an Internet Relay Chat (IRC) protocol, and a client program may electronically transmit a request to the service to create a new communication channel with a unique identifier (which may also be called a "room" or "topic"). Here, a channel location may comprise, for example, a protocol name indicating use of the Internet Relay Chat protocol, a service location, and a unique identifier for the channel.

As another example, a client program may select another Internet Relay Chat service that is separate from a service, and may create a communication channel there, such as a message exchange service, for example. As yet another example, a protocol may include, for example, the Extensible Messaging and Presence Protocol (XMPP), and a communication channel location may comprise, for example, a protocol name indicating use of XMPP, a client program's XMPP address, and a unique identifier for the communication channel. As yet another example, a protocol may comprise, for example, the Simple Mail Transport Protocol (SMTP), and a communication channel location may comprise, for example, a protocol name indicating use of SMTP, and a client program's SMTP address (e.g., e-mail address, etc.), which may include a unique identifier for a communication channel. As yet another example, a client program may create a new topic at a public Internet message board, also called a forum, and a communication channel location may comprise a URL of the topic. It should be appreciated that there is a number of ways to create a bi-directional channel on a network, such as hosted by a service, separate message exchange, or the like.

Depending on an implementation, a communication channel may comprise, for example, a sequence of electronic messages with a particular subject line on an existing communication medium, such as e-mail, and/or as a dedicated instant-messaging channel hosted by a service (e.g., service 114, etc.) and/or by any other suitable network service, referenced herein via a "message exchange" (e.g., message exchange 326 of FIG. 3, etc.). In some instances, it may be determined whether it may be useful to encrypt a communication over a new communication channel, as referenced at operation 614. For example, a client program (e.g., client program 308 of FIG. 3, etc.) may create a channel with a service (e.g., service 114, etc.) to which it intends to authenticate, and a channel protocol may include Transport Layer Security (TLS), which may encrypt transmitted content, and since the same service created the channel, it may not be useful to further encrypt a message. However, in some instances, if a client program creates a communication channel with a message exchange that is separate from a service, even if a communication channel protocol includes TLS, it may be useful to encrypt a message transmitted via the communication channel so that a message exchange may not be able to extract authenticated session information from the transmitted message.

Continuing with the above process, if no, example process 600 may proceed to operation 620, discussed below. If a choice is to encrypt a communication over a new communication channel, example process 600 may proceed to operation 616 so as to generate a secret key for the encryption. For example, an encryption key may be generated using a random number generator, pseudo-random number generator, or like techniques. In some instances, a client program (e.g., client program 202, client program 308 of FIG. 3, etc.) may also connect to a remote service that may provide random numbers that may be used in key generation, in whole or in part. It may be useful for a random number to be relatively large to be suitable as an encryption key for a selected symmetric encryption algorithm, and the length of the random number may be dependent, at least in part, on an encryption algorithm. To illustrate, if an encryption algorithm is AES, a random number may be 128, 192, or 256 bits long, but if an encryption algorithm is 3 DES, a key length may be 168 bits. Claimed subject matter is not so limited, of course. For example, at times, Blowfish, Twofish, or any other symmetric cipher may be used herein, in whole or in part.

Subsequently, such as at operation 618, a signed URL may be encrypted, such as with an encryption secret key, for example, using one or more appropriate techniques. With regard to operation 620, a signed service URL and/or an encrypted signed service URL may be electronically communicated to a message exchange. Likewise, here, example process 600 may exit or terminate at operation 622, such as to return to example process 500 of FIG. 5, for example.

Figure 7:
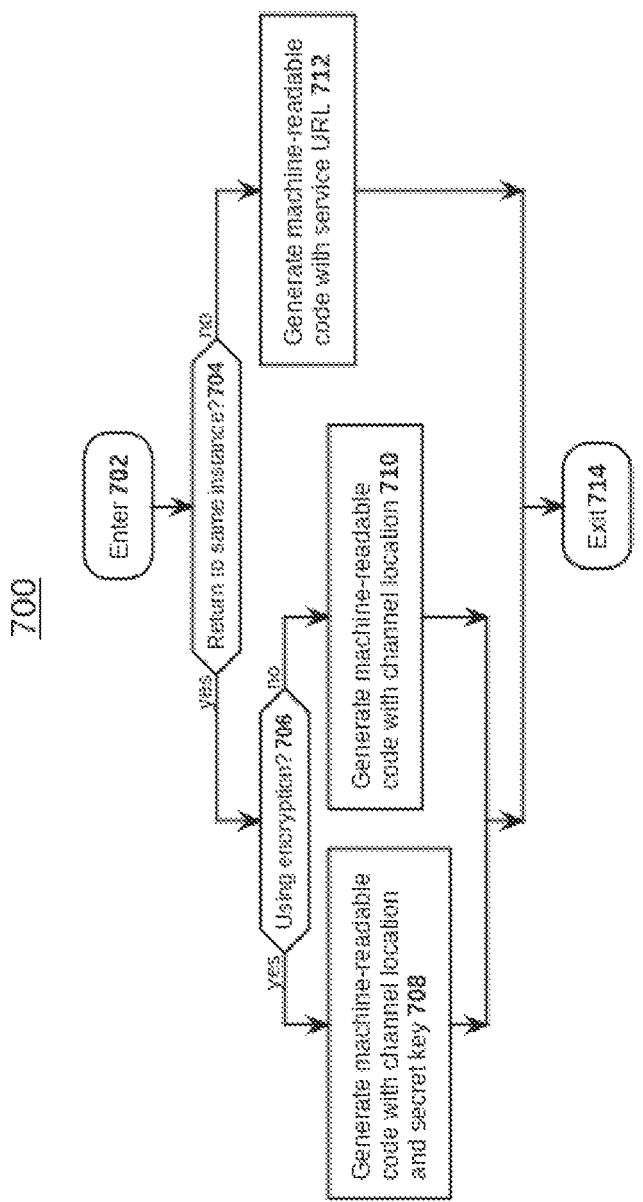
FIG. 7 is a flow diagram illustrating an implementation of an example process for generating a machine-readable code.

Referring now to FIG. 7, which is a flow diagram illustrating an implementation of an example process 700 that may be performed, in whole or in part, to facilitate and/or support one or more operations and/or techniques for generating a machine-readable code that, in some instances, may be implemented, at least in part, in connection with operation 518 of FIG. 5. As was indicated, example process 700 may, for example, be performed if an authenticator is not on the same device, such as determined in connection with operation 518 of FIG. 5. Likewise, it should be noted that information acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 700 may begin, such as at operation 702, for example, and may proceed to operation 704 so as to determine whether to return a user to the same instance of a client program, such as similar to operation 504 of FIG. 5. If yes, example process 700 may proceed to operation 706 so as to determine whether to use encryption, such as similar to operation 614 of FIG. 6. For example, as was previously discussed, such as with reference to FIG. 3, a client program may create a communication channel with a service, and a channel protocol may include Transport Layer Security (TLS), which may encrypt transmitted content, and since the same service created an authenticated channel, it may not be useful to further encrypt one or more electronically communicated messages. However, in some instances, such as if a client program creates a communication channel with a message exchange that may be separate from a service, for example, even if a channel protocol includes TLS, in that case, it may be useful to encrypt one or more messages transmitted via the channel so that a message exchange may not be able to extract authenticated session information from the transmitted messages.

Thus, continuing with the above process, if yes, a machine-readable code with a channel key location and a secret key may, for example, be generated, as referenced at operation 708. For example, a first client device (e.g., client device 302 of FIG. 3, etc. may generate a machine-readable code using one or more appropriate techniques, such as via a bar code, Quick Response (QR) code, or like format. This code may, for example, encode suitable information or content for electronic transmission to a second client device, such as a channel location and, if encryption is being used, an encryption key for the channel. Here, a channel location determined in connection with operation 612 of FIG. 6 may, for example, be used, at least in part. Likewise, here, a secret key determined in connection with operation 616 of FIG. 6 may be used herein, in whole or in part, for example.

If a decision at operation 706 is not to use encryption, a first client device (e.g., client device 302 of FIG. 3, etc.) may generate a machine-readable code at operation 710, such as with a channel location determined in connection with operation 612 of FIG. 6, for example. If, at operation 704, a decision is made to not return to the same instance of a client program, for example, then a first client device (e.g., client device 302 of FIG. 3, etc.) may generate a machine-readable code with a service URL, as referenced at 712. As a way of illustration, a machine-readable code with a service location generated in connection with operation 712 may be utilized, at least in part, if, for example, a client program on a first client device (e.g., client program 308 on client device 302, etc.) does not need a user to return to it with an authenticated session. As one example, a client device may comprise a kiosk, such as a ticket checker at a movie theater that may need or ask a user to login on a second client device, for example, such as a user's smartphone, and show the ticket. Here, a first client device may share just a service location.

As a way of another illustration, a machine-readable code with a channel location generated in connection with operation 710 may, for example, be utilized, at least in part, if a client program on first client device (e.g., client program 308 on client device 302, etc.) needs and/or asks a user to return to it with an authenticated session, and it uses a service to create a communication channel using a protocol that may encrypt transmitted content. Here, since a service authenticates a user and provides a communication channel, for example, there may be no need and/or use to separately encrypt a message transmitted over that channel.

As a way of another illustration, a machine-readable code with a channel location and secret key generated in connection with operation 708 may be utilized, at least in part, if, for example, a client program on the a client device (e.g., client program 308 on client device 302, etc.) needs and/or asks a user to return to it with an authenticated session. This may be useful if a client program uses a service to create a communication channel using an insecure protocol that may not encrypt transmitted content, for example, and messages may need to be encrypted to prevent a network observer from extracting authenticated message information from the channel. This may also be useful if a client program uses a separate message exchange to create a channel with a secure protocol that may encrypt transmitted content, for example, but messages may still need to be encrypted to prevent a separate message exchange from extracting authenticated session information from the channel. Likewise, as referenced generally at 714, example process 700 may exit or terminate, such as to return to example process 500 of FIG. 5 (e.g., proceed to operation 520, etc.), for example.

Figure 8:
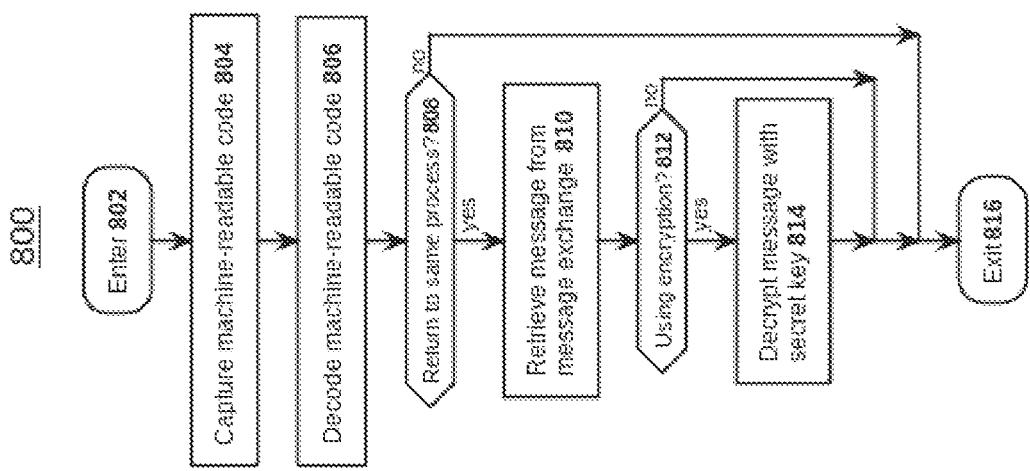
FIG. 8 is a flow diagram illustrating an implementation of an example process for transferring an authenticated session via a machine-readable code.

Referring now to FIG. 8, which is a flow diagram illustrating an implementation of an example process 800 that may be performed, in whole or in part, to facilitate and/or support one or more operations and/or techniques for transferring an authenticated session via a machine-readable code that, in some instances, may be implemented, at least in part, in connection with operation 522 of FIG. 5. Likewise, it should be noted that information acquired or produced, such as, for example, input signals, output signals, operations, results, etc. associated with example process 700 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, at operation 802, example process may begin and may proceed to capturing a machine-readable code, as referenced at 804, such as via one or more appropriate techniques. For example, a machine-readable code may be displayed on a user interface of an associated screen or display of a first client device (e.g., on display 314 of client device 302 of FIG. 3, etc.) and may be captured via a camera or like functionality of a second client device (e.g. camera 324 of client device 102 of FIG. 3, etc.). At operation 806, a second client device may, for example, decode a captured machine-readable code via one or more appropriate techniques, such as to extract a channel location and a secret key, if encoded. If a decision is made to return a user to the same instance of a client program, such as at operation 808, for example, and similarly to operation 504 of FIG. 5, a second client device may electronically access a message exchange or like process (e.g., message exchange 326 of FIG. 3, etc.) and may retrieve an electronic message previously communicated by a first client device, such as in connection with operation 622 of FIG. 6. As was indicated, in some instances, such a message may comprise, for example, an encrypted signed URL, though claimed subject matter is not so limited.

If, however, a decision at operation 808 is made not to return a user to the same instance of a client program, example process 800 may exit or terminate, such as to return to example process 500 of FIG. 5 (e.g., proceed to operation 516, etc.), for example. In such a case, a machine-readable code decoded in connection with operation 806 may comprise a machine-readable code with a service URL, such as generated in connection with operation 712 of FIG. 7. If there is a decision that encryption is to be used, in whole or in part, which may be determined in connection with operation 614 of FIG. 6, for example, and as referenced herein via operation 812, a second client device may decrypt a message using an encryption key, as referenced at operation 814, such as via one or more appropriate techniques. Here, an encryption key generated in connection with operation 616 of FIG. 6 may, for example, be used, at least in part. Likewise, as referenced generally at 816, example process 800 may exit or terminate, such as to return to example process 500 of FIG. 5 (e.g., proceed to operation 516, etc.), for example.

Figure 9:
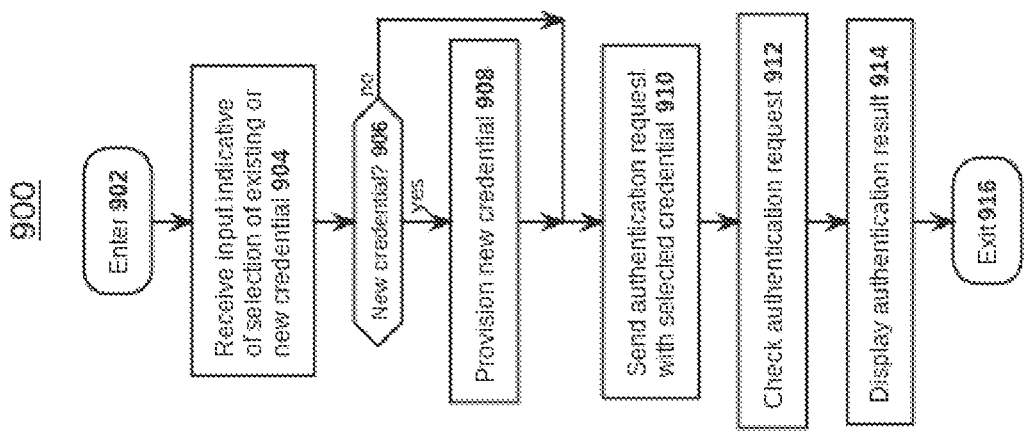
FIG. 9 is a flow diagram illustrating an implementation of an example process for authenticating an on-line user to a service.

Continuing now with FIG. 9, which is a flow diagram illustrating an implementation of an example process 900 that may be performed, in whole or in part, to facilitate and/or support one or more operations and/or techniques for authenticating an on-line user to a particular service that be implemented, at least in part, in connection with operation 408 of FIG. 4. Likewise, it should be noted that information acquired or produced, such as, for example, input signals, output signals, operations, results, etc. associated with example process 900 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as referenced at 902, example process 900 may begin and may proceed to operation 904 at which input indicative of a selection of an existing or new credential may be received. For example, a client program may allow a user to maintain multiple user credentials to use with a service. If multiple credentials are allowed and/or maintained, a client program may, for example, present a list of existing credentials to a user and may allow the user to select an existing credential or to create a new credential. To illustrate, a user may, for example, employ one or more elements of a user interface to select an existing user credential, or may click on or activate a hyperlink, button, etc., such as displayed on a user interface of an associated display so as create a new user credential, such as discussed above. If multiple credentials are not allowed and/or maintained, a client program may, for example, check if a user credential already exists for a particular service, as also discussed above, and may create a new user credential if it does not exist. These one or more decisions are referenced generally via operation 906.

Continuing with the above process, if no, example process 900 may proceed to operation 910, discussed below. If yes, example process 900 may provision a new user credential, such as at operation 908. For example, as discussed above, a user credential may be provisioned by generating an asymmetric key pair comprised of a private key and a public key, the key pair meeting requirements of an asymmetric cryptographic algorithm, such as RSA, EC, or the like. As was also indicated, in some instances, a user credential may, for example, be stored by and/or accessible to an authenticator on a client device. A public key may be transmitted to a service during authentication. It should be noted that claimed subject matter is not limited to a particular authentication approach, such as use of asymmetric key pair, for example. Any other suitable authentication approaches, such as a password-based authentication, and/or one or more other authentication approaches that may be supported by a service and a client device may be employed herein, in whole or in part.

With regard to operation 910, an authentication request, such as with a selected user credential may, for example, be electronically transmitted, such as to a service via one or more communications links. It should be noted that any suitable approach for a user credential, such as utilizing usernames, passwords, asymmetric keys, one-time passcodes, or the like may be employed herein, in whole or in part. For example, in some instances, such as if a user credential comprises a username and password, such a user credential may be electronically transmitted to a service in connection with an authentication approach, just to illustrate one possible implementation. As another example, if a user credential comprises a private key in an asymmetric key pair, for example, the private key may be used, at least in part, to sign an authentication request and electronically transmit the signed authentication request to an applicable service. For example, in some instances, a signed authentication request may comprise a sequence of bytes representing a URL, a public key of a user credential, a signature of the URL by the private key of the user credential, and/or any other suitable information or content that may be useful for validating a digital signature, such as a unique random number, a sequence number, a representation of a date and/or time, signature algorithm identifier and/or parameters, or the like. At times, a user may be authenticated by a service by issuing a challenge, such as, for example, a large random number and/or additional information (e.g., a resource location, etc.) and then checking that an authentication request comprises a digital signature for the challenge by a user credential, such as a private key.

At operation 912, an authentication request may, for example, be checked, such as for its validity. Here, an asymmetric key pair approach, such as RSA, EC, etc. discussed above may be employed, at least or in part, just to illustrate one possible implementation. For example, for validation, RSA, EC, etc. may use a public key of a user credential to check an authentication request and it may result in a binary decision, such as a success or failure. A service may also check one or more other conditions, such as whether an authentication request is unique, whether an asymmetric algorithm and/or parameters are acceptable, whether one or more known attributes of a user credential are acceptable, and, likewise, the result may be indicated as a success or failure. Thus, if a client program has submitted an invalid authentication request, such as one that may not be successfully verified with a public key of a user credential, for example, or if a client program has submitted a duplicate authentication request, such an authentication request may be denied herein. For the above password example, a password may be sent in its plain form and a service may check if this password matches a stored password (e.g., via a comparison, etc.). In some instances, such as if a stored password was processed with a one-way transformation for storage, for example, an incoming plain password may be similarly processed with the same or similar one-way transformation to compare to the stored transformed password. If the result of operation 912 is success, a service may provision an authenticated session, such as also discussed above, and may return it to an appropriate client program. If the result of operation 912 is failure, however, a service may not provision an authenticated session and may return an error message to a client program, for example.

As referenced at 914, a result of an authentication session may, for example, be communicated and/or presented in a suitable manner, such as via an appropriate message or like indication displayed in a user interface of an associated display, as one possible example. As a way of illustration, a message may be indicative of a success or failure to authenticate. If an authentication result is success, for example, an associated authenticator may be in possession of applicable authenticated session information. For example, authenticated session information may comprise a session token, "cookie," "forward URL," or any other suitable electronic file and/or object that may be used, in whole or in part, to make one or more subsequent requests to a service in order to access a protected resource, such as without repeating example process 900. It should be noted that, for ease of discussion, authenticated session information may be simply referred to as an "authenticated session" and may include one or more pieces of information that an authenticated client device may possess, such as a service URL to which the authenticated session may apply, for example. As further illustrated at 916, example process 900 may exit or terminate, such as to return to example process 400 of FIG. 4 (e.g., proceed to operation 410, etc.), for example.

Figure 10:
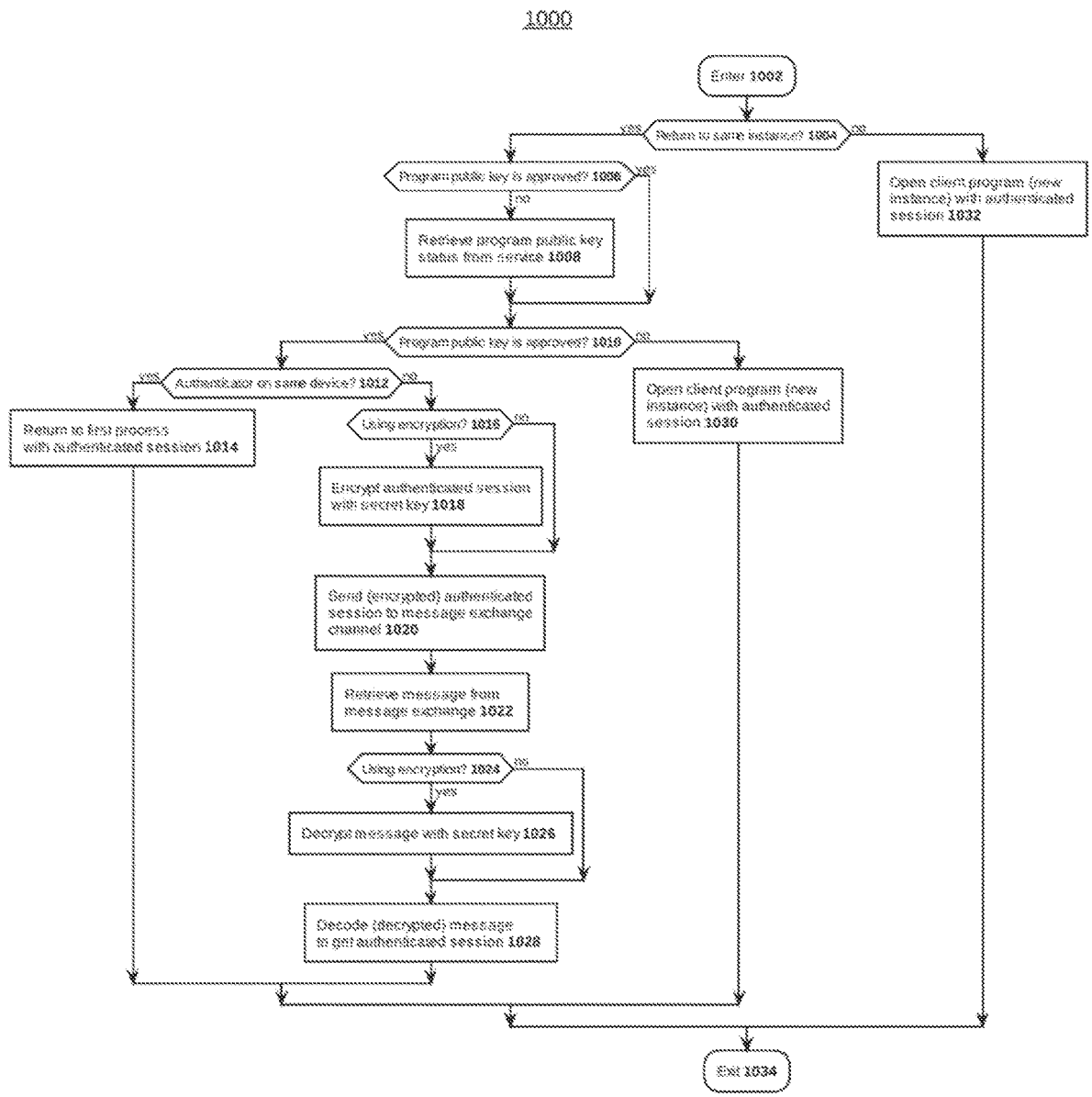
FIG. 10 is a flow diagram illustrating an implementation of an example process for switching from authentication instructions to browser instructions.

FIG. 10 is a flow diagram illustrating an implementation of an example process 1000 that may be performed, in whole or in part, to facilitate and/or support one or more operations and/or techniques for switching or transitioning from authentication instructions to browser instructions that be implemented, at least in part, in connection with operation 412 of FIG. 4. As was indicated, example process 1000 may be implemented if authentication instructions are not integrated, such as with browser instructions, for example, in a single client computer program or process. Likewise, it should be noted that information acquired or produced, such as, for example, input signals, output signals, operations, results, etc. associated with example process 1000 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, example process 1000 may begin, as referenced at 1002, and may proceed to operation 1004, such as for a decision as to whether to return a user to the same instance of a client program, for example, such as similarly to operation 504 of FIG. 5. If yes, example process 1000 may, for example, proceed to operation 1006 to determine whether a program public key of a first instance of a client program (e.g., a browser initially opened for authentication, etc.) is approved. As was indicated, a program public key may comprise, for example, a public key part of a program credential. As also discussed above, a program credential may be provisioned by generating an asymmetric key pair comprised of a private key and public key, the key pair meeting the requirements of an asymmetric cryptographic algorithm, such as RSA, EC, or the like. Likewise, a program credential may be stored and/or accessible by a browser on a client device (e.g., client device 102, 302, etc.). Here, approval may mean that a client program may initiate an authentication activity for a particular service. In some instances, this may, for example, be implemented via accessing a suitable memory (e.g., storage 110 on client device 102 of FIGS. 1-3, etc.) to read a collection of stored program credential public keys. For example, a client program (e.g., client program 204 of FIGS. 2, 3, etc.) may store a collection of service locations to which it has previously authenticated and, for a particular service location, it may further store a list of program credential public keys approved for use with an associated service. A specific format used for storage is not limited by claimed subject matter, but may include, for example, a directory of text or other files, where a name of a text file may comprise an encoded service location, for example, and content may comprise an encoded collection of approved program credential public keys for that service, as another example. Likewise, claimed subject matter is not so limited. For example, in some instances, the format may comprise, for example, a zip file with a similar internal structure, a local database, such as SQLite, or any other suitable format.

Continuing with the above proves, if a program public key is not approved, however, example process 1000 may, for example, proceed to operation 1008, such as to retrieve a status of a program public key from a service. For example, a service may provide an application programming interface (API) that may be accessed by one or more authenticated client programs (note that, at operation 1008, a client program, such as client program 204 of FIG. 3, etc. has already been authenticated to service 114) to retrieve a collection of program credential public keys approved for use with that service. Here, an API may, for example, be accessed via a Hypertext Transfer Protocol Secure (HTTPS) protocol, and a client program (e.g., client program 204 of FIG. 3, etc.) may request one or more approved credential public keys, and/or those that have been approved since a specified date, and/or a specific program credential, such as evaluated in connection with operation 1006.

Typically, although not necessarily, if a program public key is approved at operation 1006, for example, then it may also be approved at operation 1010. If a program public key is not approved at operation 1006, for example, but a result of operation 1008 indicates that it is approved, then it may be approved at operation 1010. For example, if a client program (e.g., client program 204 of FIG. 3, etc.) requests a collection of program credential public keys that matches a program credential public key being evaluated in connection with operation 1006, and a service responds with a program credential public key that matches the one being evaluated in connection with operation 1006, the client program then may store that program credential public key as an approved public key for the service. So, if this condition is evaluated again in connection with operation 1010, it will succeed. However, if a client program makes such a request to a service and the service responds with an empty collection, an error message, or the like, then this may mean that a matching program credential public key was not found and, therefore, a program credential public key being evaluated in connection with operation 1006 that was initially not approved, may not change in status and may remain not approved.

If a decision at operation 1010 is that a program public key is approved, example process 1000 may proceed to operation 1012, for example, so as to determine whether an authenticator is on the same client device, such as similarly to operation 508 of FIG. 5 and/or operation 610 of FIG. 6, discussed above. If yes, example process may proceed to operation 1014, for example, so as to return to a first or the same instance of a client program (e.g., a browser that originated an authentication process, etc.), such as with a URL for an authenticated session. A particular approach for returning to a first or the same instance of a client program may depend on an implementation. For example, typically, although not necessarily, a first or the same instance of a client program that initiates or starts a second instance of a client program may have access to an output of the second or new instance of the client program, such as, for example, an input stream, pipe, or file. Here, any suitable approach may be utilized, in whole or in part. For purposes of explanation, some operating systems, such as Linux, MacOS, Windows, or the like may provide a mechanism for a first program to request a host operating system to initiate execution or start a second program and to configure the second program's input and output such that the first program may be able to write content to the second program's input stream and read content from the second program's output stream. These or like operating systems may also provide a mechanism for a first program to create a bi-directional pipe or channel from which it may read content and to which it may write content, and later a second program may communicate with the first program by writing to the pipe and reading from the pipe. These or like operating systems may also provide a filesystem to which a program may write files and read files, such that a first program may write a file with input for a second program, and then start a second program to read content of the file, perform one or more operation and write output to a second file, and then the first program reads the results from the second file. Some operating systems, such as Android or the like may provide a mechanism for a first program to request a host operating system to start a second program with one or more inputs, and if the second program has completed its processing, the operating system may calls a specific function in the first program with the outputs of the second program. These or like mechanisms, depending on an operating system, may be available to a client program executing on the same client device to exchange one or more messages, such as without the use of a separate message exchange service, for example. Claimed subject matter is not limited to a particular mechanism and/or approach, of course.

However, if it is determined that authenticator instructions are not on the same client device, such as at operation 1012, example process may proceed to operation 1016, for example, to determine if encryption is being used, such as similarly to operation 614 of FIG. 6. If no, example process 1000 may proceed to operation 1020, discussed below. If encryption is used, example process 1000 may proceed to operation 1018 so as to encrypt an authenticated session with a secret key, such as generated in connection with operation 616 of FIG. 6, for example, using one or more appropriate encryption techniques. With regard to operation 1020, an authenticated session or encrypted authenticated session, if encryption is used, may be electronically transmitted to a message exchange channel. For example, a client program on a client device (e.g., client program 204 on client device 102 of FIG. 3, etc.) may prepare a message, may encrypt it, such as if encryption is being used (e.g., using a secret key that obtained in connection with operation 806 of FIG. 8), and may electronically transmit the message to a message exchange (e.g., message exchange 326 of FIG. 3, etc.), for example, using channel information that it received (e.g., in connection with operation 806 of FIG. 8, etc.). An approach for transmitting a message to a message exchange channel may depend, at least in part, on a message exchange selected. For example, as was discussed, any suitable message exchange that may be supported by a service as well as a client program may be utilized herein, in whole or in part. As a way of illustration, Internet Relay Chat (IRC), Extensible Messaging and Presence Protocol (XMPP), e-mail, a website with forum program, an API of a service, or the like may be employed, in whole or in part, such as create a suitable connection, to format and/or transmit a message, or the like. A first instance of a client program then may retrieve such a message from a message exchange, as referenced at 1022 at step 2020. Here, a first instance of a client program may receive a communication from a message exchange that a new message is available, or the first instance of a client program may continually poll the message exchange to check if a new message is available, just to illustrate a few possible implementations. Again, a particular technique may, for example depend, at least in part, on a particular implementation of a message exchange utilized at operation 612 of FIG. 6.

With regard to operation 1024, it may be determined whether a first instance of a client program is using encryption, such as similarly to operation 614 of FIG. 6. If no, example process may proceed to operation 1028, discussed below. If it is determined that encryption is being used, a message from a message exchange may, for example, be decrypted, such as using a secret key and employing one or more appropriate techniques, as referenced at 1026. Likewise, here, a secret key generated in connection with operation 616 of FIG. 6 may, for example, be employed, in whole or in part. Having decrypted a message, example process 1000 may, for example, proceed to operation 1028 so as to decode the message using one or more appropriate decoding techniques so as to obtain an authenticated session. For example, in some instances, a client program on a client device (e.g., client program 308 on client device 302 of FIG. 3, etc.) may retrieve a message from a message exchange (e.g., in connection with operation 1022), may decrypt it (e.g., in connection with operation 1026, etc.), and may decode the (possibly decrypted) message in connection with operation 1028. In some instances, such as if a message contained authenticated session information, for example, then decoding the message may make that information available for use by a client program.

If a program public key is not approved, however, such as at operation 1010, example process 1000 may proceed to operation 1030, for example, and may generate a new instance of a client program, such as via a new execution of computer-readable instructions for a client program (e.g., program 202 of FIGS. 2 and/or 3, etc.) with an authenticated session to a service. Similarly, if, at operation 1004, a decision is made to not return a user to the same instance of a client program from which an authentication activity started, a new instance of a client program may, for example, be generated, such as at operation 1032, via a new execution of computer-readable instructions for a client program (e.g., program 202 of FIGS. 2 and/or 3, etc.) with an authenticated session to a service. Thus, as illustrated, prior to termination at operation 1034, example process 1000 may return an authenticated session to a first or the same instance of a client program via operation 1014 or via operations 1016 through 1028, or may generate a new instance of a client program via operation 1030 or 1032 and may provide the authenticated session to the new instance of the client program.

Figure 11:
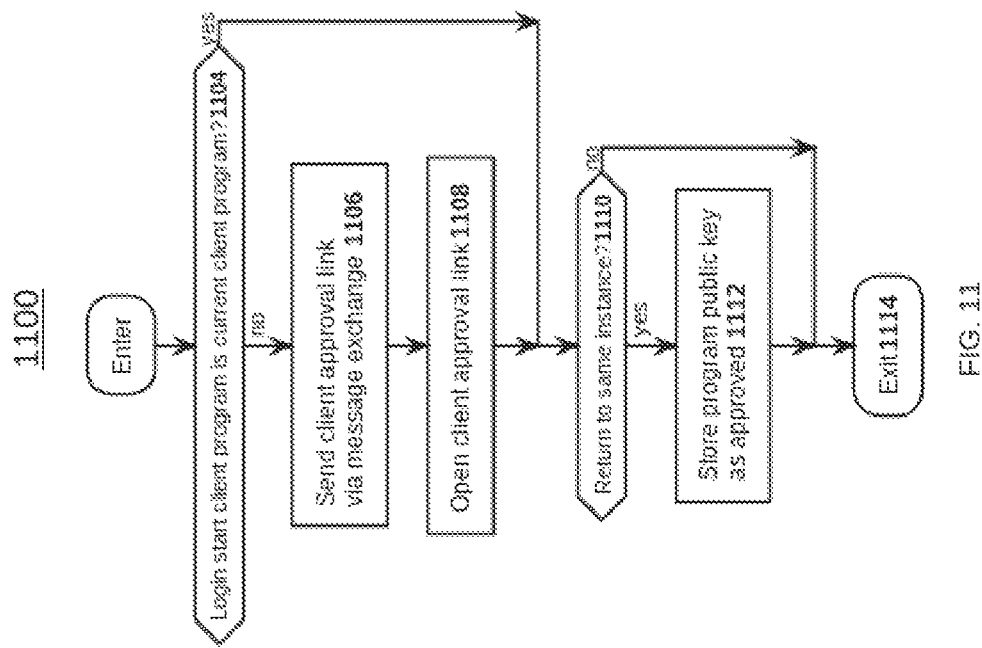
FIG. 11 is a flow diagram illustrating an implementation of an example process for transferring an authenticated session and approving a client program.

Referring now to FIG. 11, which is a flow diagram illustrating an implementation of an example process 1100 that may be performed, in whole or in part, to facilitate and/or support one or more operations and/or techniques for transferring an authenticated session and approving a client program. As was indicated, in some instances, example process 1100 may be implemented, at least in part, in connection with operation 414 of FIG. 4. Likewise, it should be noted that information acquired or produced, such as, for example, input signals, output signals, operations, results, etc. associated with example process 1100 may be represented via one or more digital signals. It should also be appreciated that even though one or more operations are illustrated or described concurrently or with respect to a certain sequence, other sequences or concurrent operations may be employed. In addition, although the description below references particular aspects and/or features illustrated in certain other figures, one or more operations may be performed with other aspects and/or features.

Thus, as illustrated, example process 1100 may begin at operation 1102 and may, for example, proceed to determine whether a login start client program is a current client program, as referenced at operation 1004. Depending on an implementation, a client program may be considered a login start client program or a current client program. For example, a client program initiating a login (e.g., in connection with operation 402 of FIG. 4, etc.) and subsequently signing a service location with its program private key (e.g., in connection with operation 608 of FIG. 6, etc.) may be considered and/or referred to as a "login start client program" (e.g., client program 202 and/or 308 of FIG. 3, etc.). Subsequently, a client program (e.g., client program 204 of FIG. 3, etc.) may determine, such as described in connection with operations 1004 and/or 1010 of FIG. 10, which client program may receive an authenticated session. In at least one implementation, operations 1030 and/or 1032 may result in a new instance of a client program (e.g., client program 202 of FIG. 3, etc.) receiving an authenticated session, and, therefore, a current client program at operation 1104 may not be considered or referred to as a "login start client program." In another implementation, operations 1014 and/or 1020 may result in a login start client program receiving an authenticated session, and, therefore, a current client program at operation 1104 may be considered or referred to as a "login start client program." Of course, these are merely details relating to a particular implementation of client programs, and claimed subject matter is not limited in this respect.

Thus, as discussed above with reference to example process 1000, prior to exiting, an authenticator may return an authenticated session to a first or the same instance of a client program, for example, such as if it was determined to be approved at step 1010 or an authenticated session may create a new instance of a client program and provide the authenticated session to it. Thus, if a first or the same instance of a client program was determined to be approved at operation 1010, a login start client program may be determined to be a current client program, and a decision at operation 1104 is "yes," in which case example process 1100 may proceed to operation 1110, discussed below. Otherwise, if a new instance of a client program was created at operation 1030 or 1032 of FIG. 10, a decision at operation 1104 is "no."

Continuing with the above discussion, if a login start client program is not the same as a current client program, example process 1100 may, for example, proceed to operations 1106 and 1108 so as to transfer an authenticated session to another instance of a client program on the same device or on another device. More specifically, at operation 1106, a client program approval hyperlink may, for example, be generated and electronically transmitted via a message exchange. For example, at times, a client program approval hyperlink may be generated by a service 114, such as by creating a unique identifier, associating the identifier with an authenticated session, and concatenating a server URL with a service-defined path and the unique identifier so that if a client program submits a request to retrieve content referenced by the client program approval hyperlink, the service may be able to recognize the unique identifier in that hyperlink. If a client program performing operation 1108 opens a client program approval hyperlink, such as by transmitting the hyperlink to a service, for example, the service may recognize a unique identifier in the hyperlink, retrieve an associated authenticated session, and make the client program's session an authenticated session.

It should be noted that a message exchange at operation 1106 may or may not be the same as message exchange employed in connection with operation 620 of FIG. 6. For example, at operation 1106, a message may comprise an e-mail sent to a user's e-mail address, just to illustrate one possible implementation. Example process 1100 may then open a new instance of a client program, for example, and may provide a hyperlink in an e-mail as an input parameter to the new instance of a client program, as referenced at 1108. It should also be noted that operations 1106 and 1108 may be implemented, at least in part, via separate client devices. Example process 1100 may then proceed to operation 1110 to determine whether to return a user to the same instance of a client program, for example, such as at the end of authentication, such as similarly to operation 504 of FIG. 5. If a decision at operation 1110 is to return a user to the same instance of a client program, then, at operation 1112, a program public key may, for example, be electronically transmitted to a service to be stored and electronically marked as approved. For example, if, at operation 1104, a login start client program is not a current client program, operations 1106 and/or 1108 may result in a new instance of a client program (e.g., client program 202 or client program 308 of FIG. 3, etc.) obtaining an authenticated session to a service. If a new client program instance attempts to return to the same instance, which may have the same outcome at operation 1110, for example, then it already may have a client program credential stored in an associated storage (e.g., storage 110 and/or storage 318 of FIG. 3, etc.), as discussed above, and it may load a public key portion of a previously stored program credential for operation 1112. Optionally, a new client program instance may generate a new program credential (not shown), such as similarly to operation 606 of FIG. 6, and may use it in connection with operation 1112. A program public key may be subsequently accessed and used, in whole or in part, to repeat authentication activity, if needed, such as in connection with operation 1008 of FIG. 10, for example. As further illustrated at 1114, example process 1100 may exit or terminate, such as to return to example process 400 of FIG. 4 (e.g., proceed to operation 416, etc.), for example.

Accordingly, as discussed herein, one or more operations and/or techniques for electronic authentication infrastructure may provide benefits. For example, as was indicated, one or more operations and/or techniques discussed herein may facilitate and/or support mitigating a phishing attack, including a proxy phishing attack, for example. In addition, electronic authentication infrastructure may provide a more convenient and/or more efficient and/or effective login process for on-line users, such as compared to one or more approaches discussed above (e.g., remembering and typing passwords, receiving and typing a one-time passcode, two-factor code, etc.). Also, the ability to login to a website using any suitable second client device (e.g., a computer in a library, etc.) without exposing a user credential to that client device, for example, may prove beneficial. Further, by employing, in whole or in part, electronic authentication infrastructure, enhanced privacy with the ability to use local biometrics to secure a client device that may store a user credentials without sharing the biometrics with a web service, for example, may be achieved. Moreover, not having to remember or write down a user credential for a number of websites and/or applications may prove useful. Also, one or more operations and/or techniques discussed herein may enhance privacy and/or security, such as by using a separate user credential with a particular website, for example. Of course, such a description of certain aspects of electronic authentication infrastructure and its benefits is merely an example, and claimed subject matter is not so limited.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," "object," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, or 4th generation (2G, 3G, or 4G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course.

Figure 12:
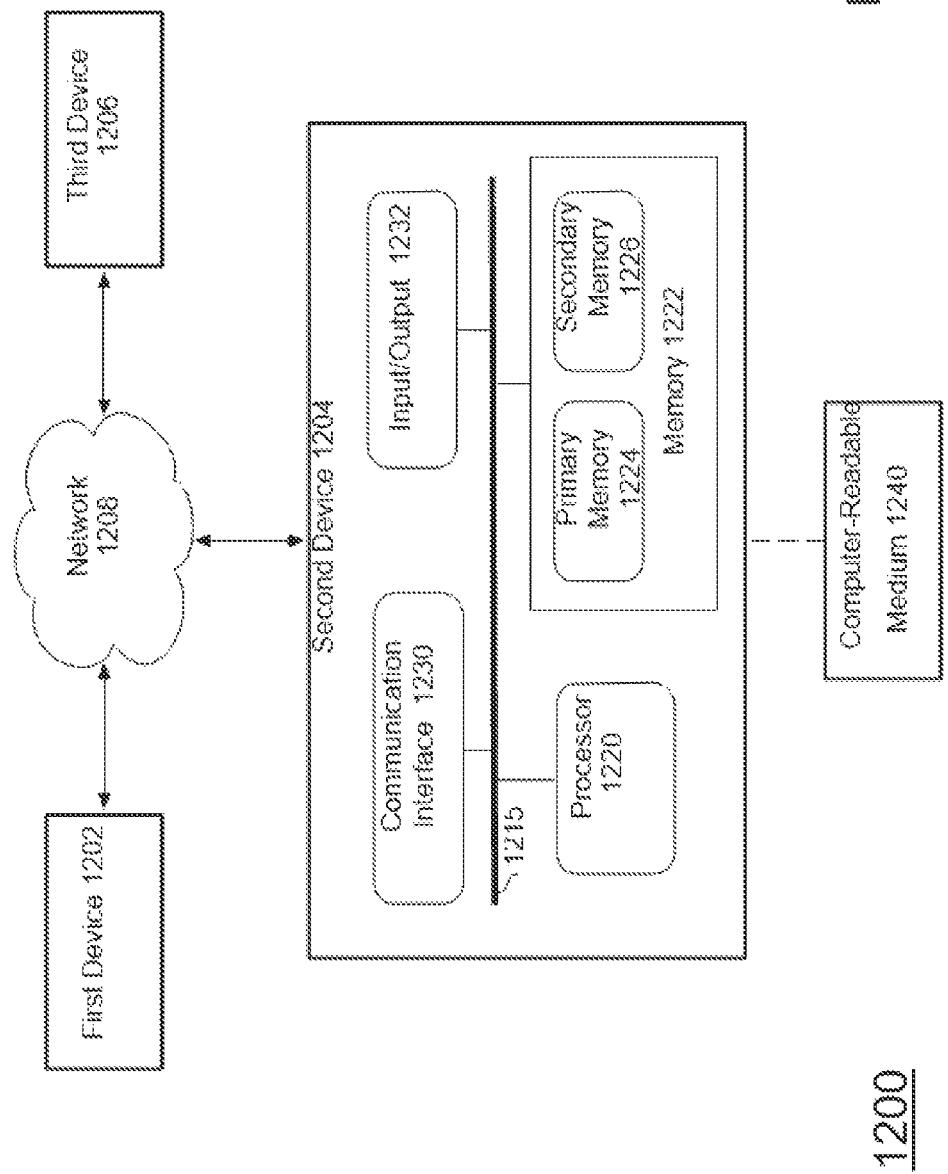
FIG. 12 is a schematic diagram illustrating an implementation of a computing device that may be employed in a client-server type interaction.

In one example embodiment, as shown in FIG. 12, a system embodiment may comprise a local network (e.g., a second device 1204 and a computer-readable medium 1240) and/or another type of network, such as a computing and/or communications network. For purposes of illustration, therefore, FIG. 12 shows an embodiment 1200 of a system that may be employed to implement either type or both types of networks. Network 1208 may comprise one or more network connections, links, processes, services, applications, and/or resources to facilitate and/or support communications, such as an exchange of communication signals, for example, between a computing device, such as 1202, and another computing device, such as 1206, which may, for example, comprise one or more client computing devices and/or one or more server computing device. By way of example, but not limitation, network 1208 may comprise wireless and/or wired communication links, telephone and/or telecommunications systems, Wi-Fi networks, Wi-MAX networks, the Internet, a local area network (LAN), a wide area network (WAN), or any combinations thereof.

Example devices in FIG. 12 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1-3 and 12 of the present disclosure.

Referring now to FIG. 12, in an embodiment, first and third devices 1202 and 1206 may be capable of rendering a graphical user interface (GUI) for a network device and/or a computing device, for example, so that a user-operator may engage in system use. Device 1204 may potentially serve a similar function in this illustration. Likewise, in FIG. 12, computing device 1202 ('first device' in figure) may interface with computing device 1204 ('second device' in figure), which may, for example, also comprise features of a client computing device and/or a server computing device, in an embodiment. Processor (e.g., processing device) 1220 and memory 1222, which may comprise primary memory 1224 and secondary memory 1226, may communicate by way of a communication bus 1215, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 1204, as depicted in FIG. 12, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (WiMAX). A computing device and/or a networking device may also have a subscriber identity module (SIM) card, which, for example, may comprise a detachable or embedded smart card that is able to store subscription content of a user, and/or is also able to store a contact list. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of e-mail, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 12, computing device 1202 may provide one or more sources of executable computer instructions in the form physical states and/or signals (e.g., stored in memory states), for example. Computing device 1202 may communicate with computing device 1204 by way of a network connection, such as via network 1208, for example. As previously mentioned, a connection, while physical, may not necessarily be tangible. Although computing device 1204 of FIG. 12 shows various tangible, physical components, claimed subject matter is not limited to computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 1222 may comprise any non-transitory storage mechanism. Memory 1222 may comprise, for example, primary memory 1224 and secondary memory 1226, additional memory circuits, mechanisms, or combinations thereof may be used. Memory 1222 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 1222 may be utilized to store a program of executable computer instructions. For example, processor 1220 may fetch executable instructions from memory and proceed to execute the fetched instructions. Memory 1222 may also comprise a memory controller for accessing device readable-medium 1240 that may carry and/or make accessible digital content, which may include code, and/or instructions, for example, executable by processor 1220 and/or some other device, such as a controller, as one example, capable of executing computer instructions, for example. Under direction of processor 1220, a non-transitory memory, such as memory cells storing physical states (e.g., memory states), comprising, for example, a program of executable computer instructions, may be executed by processor 1220 and able to generate signals to be communicated via a network, for example, as previously described. Generated signals may also be stored in memory, also previously suggested.

Memory 1222 may store electronic files and/or electronic documents, such as relating to one or more users, and may also comprise a device-readable medium that may carry and/or make accessible content, including code and/or instructions, for example, executable by processor 1220 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Referring again to FIG. 12, processor 1220 may comprise one or more circuits, such as digital circuits, to perform at least a portion of a computing procedure and/or process. By way of example, but not limitation, processor 1220 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 1220 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 12 also illustrates device 1204 as including a component 1232 operable with input/output devices, for example, so that signals and/or states may be appropriately communicated between devices, such as device 1204 and an input device and/or device 1204 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method for mitigating an on-line phishing attack, the method comprising:
electronically receiving a login request initiated from a first client program operating on a client device; and
initiating an electronic authentication process based, at least in part, on the login request, the electronic authentication process comprising:
authenticating to a server with a user credential by a second client program operating on the client device;
determining, by the second client program, whether a program credential for the first client program is approved to receive an authenticated session; and
responsive to determining that the program credential is not approved, transferring the authenticated session to a new instance of a client program operating on the client device by requesting, from a host operating system, to initiate execution of the new instance of the client program with parameters to receive the authenticated session for the login request.

2. The method of claim 1, wherein the new instance of the client program comprises at least one of the following: a new instance of the first client program; a new instance of the second client program; or a new instance of a program different than the first client program or the second client program.

3. The method of claim 1, wherein the on-line phishing attack comprises a proxy phishing attack.

4. The method of claim 1, wherein initiating the electronic authentication process comprises executing the login request and the authenticated session via a single computer program to link authenticator instructions to browser instructions.

5. The method of claim 1, wherein the electronic authentication process is implemented via the second client program transferring login parameters to a browser program.

6. The method of claim 5, wherein the electronic authentication process comprises executing the browser program and an authenticator program.

7. The method of claim 1, wherein the electronic authentication process is implemented via two or more client programs.

8. The method of claim 1, further comprising creating the user credential responsive to displaying a hyperlink selector.

9. The method of claim 1, wherein the user credential is selected without user input.

10. The method of claim 1, wherein the user credential is associated with a service.

11. The method of claim 1, and further comprising:
responsive to determining that the program credential is approved, electronically communicating a service parameter, the service parameter being utilized to receive the authenticated session, for electronically accessing a protected resource in the same instance of the first client program.

12. The method of claim 1, and further comprising electronically communicating a service parameter for electronically accessing a protected resource in the new instance of the client program operating on the client device.

13. The method of claim 1, wherein,
a protected resource is to be accessed via an electronic transfer of the authenticated session for the login request from the second client program to the first client program.

14. The method of claim 1, wherein the electronic authentication process is based, at least in part, on the program credential for authenticating the first client program to the second client program, wherein the first client program comprises a browser program, and the browser program maintains a separate program credential for each protected resource domain.

15. The method of claim 1, wherein the second client program comprises an authenticator.

16. The method of claim 15, wherein the first client program and the second client program comprise separate client programs, the separate client programs utilizing separate user interfaces.

17. The method of claim 1, wherein the program credential is used, at least in part, by the first client program to digitally sign a service parameter.

18. An apparatus comprising:
a communication interface to communicate with an electronic communications network and one or more processors coupled to a memory and to the communication interface, the communication interface and the one or more processors to:
electronically receive a login request initiated from a first client program to operate on a client device; and
initiate an electronic authentication process based, at least in part, on the login request, the electronic authentication process comprising:
authenticating to a server with a user credential by a second client program to operate on the client device;
determining by the second client program, whether a program credential for the first client program is approved to receive an authenticated session; and
responsive to determining that the program credential is not approved, to transfer the authenticated session into a new instance of a client program operating on the client device by requesting, from a host operating system, to initiate execution of the new instance of the client program operating on the client device with parameters to receive the authenticated session for the login request.

19. The apparatus of claim 18, wherein the new instance of the client program comprises at least one of the following: a new instance of the first client program, a new instance of the second client program, and a new instance of a program different than the first or the second client program.

20. The apparatus of claim 18, wherein the login request is to comprise the user credential or a part thereof.

21. The apparatus of claim 20, wherein the user credential is to be associated with a service.

22. The apparatus of claim 18, wherein responsive to the determination that the program credential is approved, the one or more processors are further to electronically communicate a service parameter, the service parameter being utilized to transfer the authentication session for accessing a protected resource back to the first client program operating on the client device.

23. The apparatus of claim 18, wherein responsive to the determination that the program credential is not approved, the one or more processors is further to electronically communicate a service parameter to electronically access a protected resource in the new instance of the client program operating on the client device.

24. The apparatus of claim 18, wherein a protected resource is to be accessed via an electronic transfer of the authenticated session for the login request from the second client program to the first client program.

25. The apparatus of claim 18, wherein the electronic authentication process is to be based, at least in part, on the program credential to authenticate the first client program to the second client program, wherein the first client program comprises a browser program, and wherein the browser program maintains a separate program credential for each protected resource domain.

26. A non-transitory storage medium having instructions executable by a processor to:
electronically receive a login request initiated from a first client program operating on a client device; and
initiate an electronic authentication process based, at least in part, on the login request, the electronic authentication process to comprise:
authenticating to a server with a user credential by a second client program operating on the client device;
determining, by the second client program, whether a program credential for the first client program is approved to receive an authenticated session; and
responsive to determining that the program credential is not approved, transferring the authenticated session to a new instance of a client program operating on the client device by requesting, from a host operating system, to initiate execution of the new instance of the client program operating on the client device with parameters to receive the authenticated session for the login request.

27. The non-transitory storage medium of claim 26, wherein the new instance of the client program comprises at least one of the following: a new instance of the first client program, a new instance of the second client program, and a new instance of a program different than the first or the second client program.

28. The non-transitory storage medium of claim 26, wherein the instructions are additionally to create the user credential responsive to display of a hyperlink selector.

29. The non-transitory storage medium of claim 26, wherein the user credential is to be associated with a service.

30. The non-transitory storage medium of claim 26, wherein the instructions executable by the processor are further to, responsive to determining that the program credential is approved, electronically communicate a service parameter, the service parameter being utilized to
transfer the authenticated session, for accessing a protected resource, back to the first client program operating on the client device.

31. The non-transitory storage medium of claim 26,
responsive to the determination that the program credential is not approved, the instructions executable by the processor being further to electronically communicate a service parameter to electronically access a protected resource in the new instance of the client program operating on the client device.

32. The non-transitory storage medium of claim 26, wherein a protected resource is to be accessed via an electronic transfer of the authenticated session for the login request from the second client program to the first client program.

33. The non-transitory storage medium of claim 26, wherein the electronic authentication process is to be based, at least in part, on the program credential to authenticate the first client program to the second client program, wherein the first client program comprises a browser program, and the browser program maintains a separate program credential for each protected resource domain.

34. An electronic authentication infrastructure, the electronic authentication infrastructure comprising:
at least one client device communicatively coupled to at least one authenticator;
at least one service communicatively coupled to the at least one client device, wherein the at least one service is accessed by the at least one client device, wherein the at least one service is communicatively coupled to the at least one authenticator,
wherein the at least one client device is programmed with instructions to:

generate a user credential to comprise at least one asymmetric key pair for authentication, wherein the at least one asymmetric key pair further comprises a user credential private key and a user credential public key;
associate the user credential with the at least one service;
  wherein the service is programmed with instructions to:
    authenticate a user by issuing a challenge, wherein the challenge comprises a large random number and additional information provided by the service; and
    check that a response to the challenge is a digital signature of the challenge by the user credential private key that is verifiable with the user credential public key;
    responsive to a determination that the user is authenticated, to electronically communicate a service parameter, the service parameter being utilized to receive an authenticated session;
determine whether a program credential is approved, wherein a login request is initiated from a first client program operating on the at least one client device of the at least one client device, and wherein the login request is authenticated via a second client program operating on the client device of the at least one client device; and
responsive to a determination that the program credential is not approved,
  transfer the authenticated session to a new instance of a client program on the client device.

* * * * *